(12) United States Patent
Ikeda et al.

(10) Patent No.: US 12,450,732 B2
(45) Date of Patent: Oct. 21, 2025

(54) INFORMATION PROCESSING APPARATUS AND INFORMATION PROCESSING SYSTEM

(71) Applicant: SONY GROUP CORPORATION, Tokyo (JP)

(72) Inventors: Kenji Ikeda, Tokyo (JP); Sakiko Hosozawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 404 days.

(21) Appl. No.: 17/796,159

(22) PCT Filed: Jan. 25, 2021

(86) PCT No.: PCT/JP2021/002359
§ 371 (c)(1),
(2) Date: Jul. 28, 2022

(87) PCT Pub. No.: WO2021/157397
PCT Pub. Date: Aug. 12, 2021

(65) Prior Publication Data
US 2023/0071901 A1    Mar. 9, 2023

(30) Foreign Application Priority Data

Feb. 6, 2020   (JP) ................................. 2020-018561

(51) Int. Cl.
*G06T 7/00* (2017.01)
*G06T 7/155* (2017.01)
(Continued)

(52) U.S. Cl.
CPC .......... *G06T 7/0012* (2013.01); *G06T 7/155* (2017.01); *G06V 10/764* (2022.01);
(Continued)

(58) Field of Classification Search
CPC .................. G06T 7/0012; G06T 7/155; G06T 2207/10064; G06T 2207/30024;
(Continued)

(56) References Cited

U.S. PATENT DOCUMENTS

| 2002/0036824 A1* | 3/2002 | Sasaki | G02B 21/16 |
| | | | 359/368 |
| 2002/0055133 A1* | 5/2002 | Hahn | C07K 1/1077 |
| | | | 548/452 |

FOREIGN PATENT DOCUMENTS

| JP | 2004-286515 A | 10/2004 |
| JP | 2016-515203 A | 5/2016 |

(Continued)

OTHER PUBLICATIONS

International Search Report and Written Opinion of PCT Application No. PCT/JP2021/002359, issued on Apr. 6, 2021, 11 pages of ISRWO.

(Continued)

*Primary Examiner* — Jerome Grant, II
(74) *Attorney, Agent, or Firm* — CHIP LAW GROUP

(57) ABSTRACT

Provided is an information processing apparatus that includes a separation unit that separates a fluorescence signal derived from a fluorescent reagent from a fluorescence image on the basis of the fluorescence image of a biological sample containing a cell, a reference spectrum derived from the biological sample or the fluorescent reagent, and morphological information of the cell.

19 Claims, 19 Drawing Sheets

(51) Int. Cl.
*G06V 10/764* (2022.01)
*G06V 10/774* (2022.01)
*G06V 20/69* (2022.01)

(52) U.S. Cl.
CPC .......... *G06V 10/774* (2022.01); *G06V 20/695* (2022.01); *G06V 20/698* (2022.01); *G06T 2207/10064* (2013.01); *G06T 2207/30024* (2013.01); *G06T 2207/30204* (2013.01)

(58) Field of Classification Search
CPC . G06T 2207/30204; G06T 2207/10024; G06T 2207/10056; G06T 2207/20084; G06T 7/90; G06T 7/11; G06T 7/174; G06V 10/764; G06V 10/774; G06V 20/695; G06V 20/698; G06V 10/82; G01N 21/64; G01N 33/48; G01N 33/53
USPC ........................................................ 382/159
See application file for complete search history.

(56) References Cited

FOREIGN PATENT DOCUMENTS

| | | | | |
|---|---|---|---|---|
| JP | 2018-185759 A | | 11/2018 | |
| JP | 2018185759 | * | 11/2018 | ........... G06T 7/0012 |
| JP | 2020020791 | * | 2/2020 | ......... G01N 21/6428 |
| WO | 2016/129061 A1 | | 8/2016 | |
| WO | 2019/110583 A1 | | 6/2019 | |
| WO | WO-2019172097 A1 | | 9/2019 | |
| WO | 2020/022394 A1 | | 1/2020 | |
| WO | WO2020022394 | * | 1/2020 | ............. G01N 33/58 |

OTHER PUBLICATIONS

Masahiko, et al., "Fluorescence Imaging with Spectral Unmixing: Application for Live Cell Imaging", Journal of The Society of Instrument and Control Engineers, vol. 45, No. 11, Nov. 10, 2006, pp. 977-981.

* cited by examiner

INFORMATION PROCESSING APPARATUS AND INFORMATION PROCESSING SYSTEM

CROSS REFERENCE TO RELATED APPLICATIONS

This application is a U.S. National Phase of International Patent Application No. PCT/JP2021/002359 filed on Jan. 25, 2021, which claims priority benefit of Japanese Patent Application No. JP 2020-018561 filed in the Japan Patent Office on Feb. 6, 2020. Each of the above-referenced applications is hereby incorporated herein by reference in its entirety.

FIELD

The present disclosure relates to an information processing apparatus and an information processing system.

BACKGROUND

In recent years, fluorescence and multiple labeling of immunostaining have progressed due to development of cancer immunotherapy and the like. For example, a method is performed in which an autofluorescence spectrum is extracted from an unstained section of a same tissue block, and then fluorescence separation of a stained section is performed using the autofluorescence spectrum.

In addition, for example, Patent Literature 1 below discloses a technique in which a fluorescence spectrum obtained by irradiating microparticles multiply labeled with a plurality of fluorescent dyes with excitation light is approximated by a linear sum of single staining spectra obtained from microparticles individually labeled with each fluorescent dye.

CITATION LIST

Patent Literature

Patent Literature 1: JP 2012-18108 A
Patent Literature 2: JP 2019-45540 A
Patent Literature 3: JP 2018-185759 A

SUMMARY

Technical Problem

Here, in recent years, fluorescence and multi-markers of immunostaining have started to advance due to the spread of cancer immunotherapy and the like. In order to use more kinds of fluorescent dyes in multicoloring, both fluorescence separation between stained fluorescence and fluorescence separation between stained fluorescence and autofluorescence require accuracy.

Therefore, the present disclosure has been made in view of the above circumstances, and provides a novel and optimized information processing apparatus and information processing system capable of performing fluorescence separation more accurately.

Solution to Problem

An information processing apparatus according to one embodiment of the present disclosure comprises: a separation unit that separates a fluorescence signal derived from a fluorescent reagent from a fluorescence image on the basis of the fluorescence image of a biological sample containing a cell, a reference spectrum derived from the biological sample or the fluorescent reagent, and morphological information of the cell.

DESCRIPTION OF EMBODIMENTS

Figure 1:
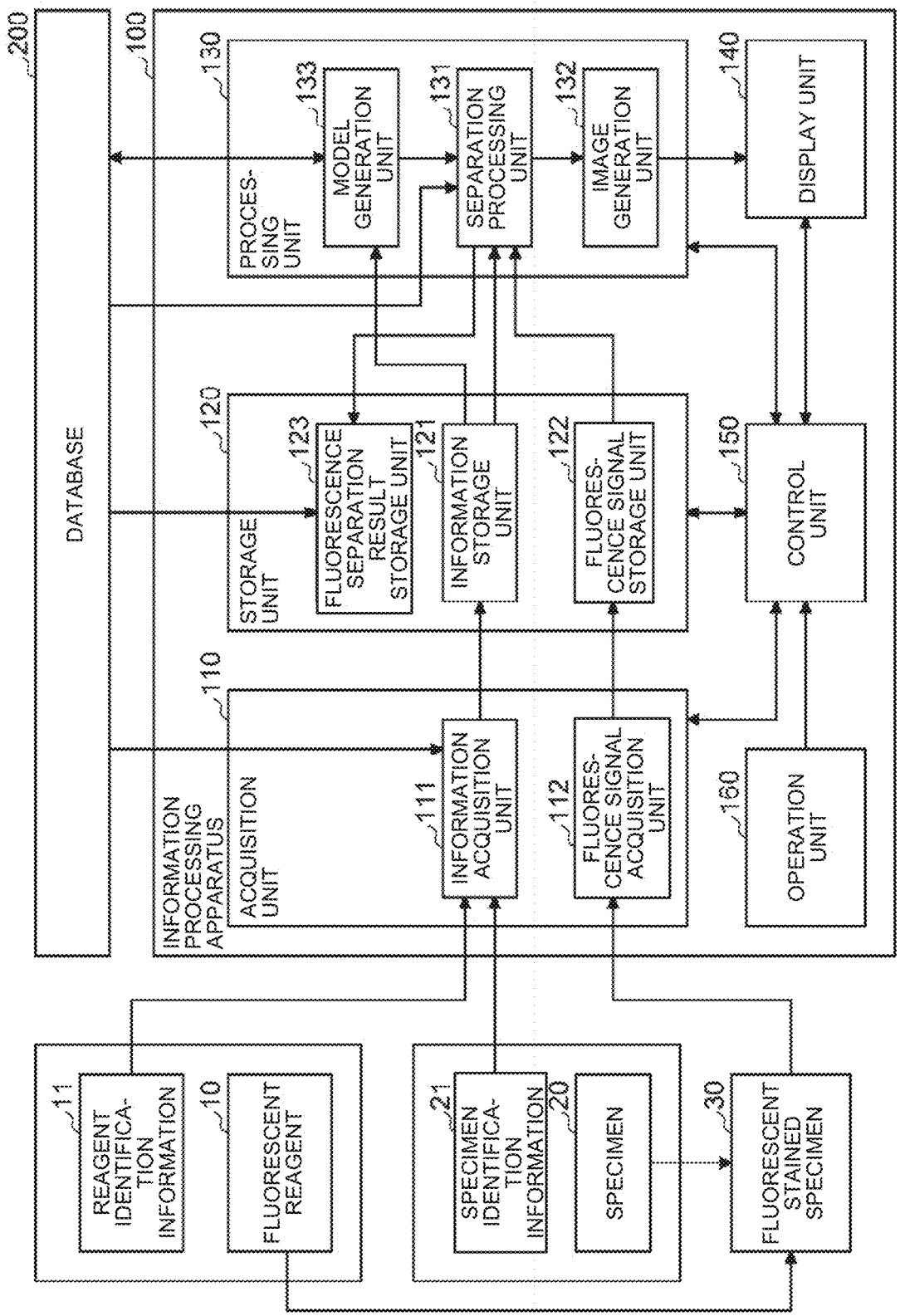
FIG. 1 is a block diagram illustrating a configuration example of an information processing system according to a first embodiment.
Figure 2:
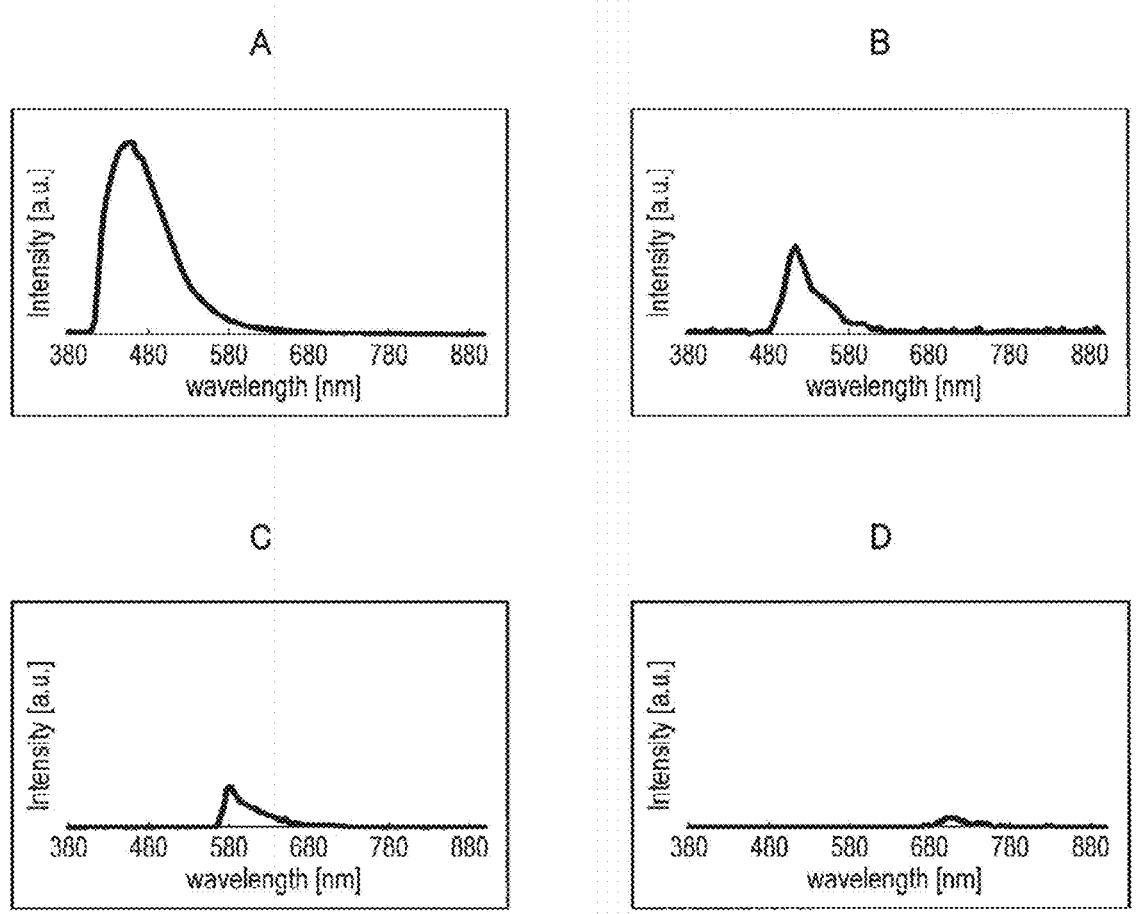
FIGS. 2A, 2B, 2C, and 2D are diagrams illustrating specific examples of fluorescence spectra acquired by a fluorescence signal acquisition unit.

Hereinafter, preferred embodiments of the present disclosure will be described in detail with reference to the accompanying drawings. Note that, in the present specification and the drawings, components having substantially the same functional configurations are denoted by the same reference numerals, and redundant description is omitted.

Note that the description will be given in the following order.
1. Introduction
2. First Embodiment
2.1. Configuration Example
2.2. Application Example to Microscope System
2.3. Processing Flow
2.4. Fluorescence Separation Processing
2.5. Training of Inference Model
2.6. Action and Effect
3. Second Embodiment
3.1. Fluorescence Separation Processing
3.2. Fluorescence Separation Processing Using Least Squares Method
3.3. Training of Inference Model
3.4. Action and Effect
4. Third Embodiment
4.1. First Procedure Example
4.2. Second Procedure Example
5. Fourth Embodiment
6. Fifth Embodiment
6.1. Method for Fixing Stained Fluorescence Spectrum in Minimization of Mean Square Residual D Using Recurrence Relation
6.2. Method for Fixing Stained Fluorescence Spectrum in Minimization of Mean Square Residual D Using DFP Method, BFGS Method, or the like
7. Hardware Configuration Example
8. Remarks
9. Modification of System Configuration
10. Application Example 1
11. Application Example 2

1. Introduction

First, the following embodiments according to the present disclosure propose an information processing apparatus and an information processing system that excite a cell (regardless of immobilized cells or floating cells) subjected to multiple fluorescence staining with excitation light of a plurality of wavelengths to perform fluorescence separation.

In fluorescence separation of cells subjected to multiple fluorescence staining, accurate fluorescence separation (fluorescence separation of stained fluorescence, fluorescence separation of stained fluorescence and autofluorescence) is required, but in imaging, there is a problem that an autofluorescence spectrum differs between pixels. When the autofluorescence spectrum is extracted and the fluorescence separation is performed for each pixel depending only on the spectrum information, an image with high contrast can be obtained for each pixel, but the pixel is easily affected by artifacts such as autofluorescence and noise. As a result, even in the morphologically same cells, a completely different fluorescence separation result may be obtained for each pixel. For example, variations in luminance and wavelength directions may occur even in one cell region, and variations in luminance and wavelength directions may occur even between cells of the same morphology.

Therefore, in the following embodiment, in addition to image information before fluorescence separation obtained by imaging a specimen stained with a fluorescent dye (corresponding to a fluorescent stained specimen to be described later) (corresponding to a fluorescence signal to be described later (also referred to as a fluorescent stained image)) and spectrum information for each molecule contained in the fluorescent dye or the specimen (corresponding to a reference spectrum to be described later), by using an inference model of machine learning to which morphological information (not limited to fluorescence; for example, an expression map of an antigen or the like) of cells, tissues, and the like that are specimens is input, a more accurate fluorescence separation result (for example, a two-dimensional image for each fluorescent dye) in which the autofluorescence region is clarified and noise is reduced is output.

In addition, in another embodiment, by using an inference model of machine learning that inputs image information before fluorescence separation and staining information such as a combination of fluorescent dyes (which may be antibody dyes) and outputs morphological information of cells, tissues, and the like that are specimens, it is possible to perform fluorescence separation using the morphological information in addition to spectrum information in fluorescence separation processing in the subsequent stage. As a result, for example, it is possible to suppress variation between pixels in the fluorescence separation result in one cell region.

2. First Embodiment

First, an information processing apparatus and an information processing system according to a first embodiment of the present disclosure will be described in detail with reference to the drawings.

2.1. Configuration Example

A configuration example of an information processing system according to the present embodiment will be described with reference to FIG. 1. As illustrated in FIG. 1, the information processing system according to the present embodiment includes an information processing apparatus 100 and a database 200, and a fluorescent reagent 10, a specimen 20, and a fluorescent stained specimen 30 exist as inputs to the information processing system.

(Fluorescent Reagent 10)

The fluorescent reagent 10 is a chemical used for staining the specimen 20, and may include, for example, an antibody labeled with a fluorescent dye. The fluorescent reagent 10 is, for example, a fluorescent antibody (primary antibodies used for direct labeling or secondary antibodies used for indirect labeling), a fluorescent probe, a nuclear staining reagent, or the like, but the type of the fluorescent reagent 10 is not limited thereto. In addition, the fluorescent reagent 10 is managed with identification information (hereinafter, referred to as "reagent identification information 11") that can identify the fluorescent reagent 10 (or the production lot of the fluorescent reagent 10). The reagent identification information 11 is, for example, bar code information (one-dimensional bar code information, two-dimensional bar code information, or the like), but is not limited thereto. Even in the case of the same product, the properties of the fluorescent reagent 10 are different for each production lot according to the production method, the state of the cell from which the antibody is acquired, and the like. For example, in the fluorescent reagent 10, the spectrum, the quantum yield, the fluorescent labeling index, or the like is different for each production lot. Therefore, in the information processing system according to the present embodiment, the fluorescent reagent 10 is managed for each production lot by being attached with the reagent identification information 11. As a result, the information processing apparatus 100 can perform fluorescence separation in consideration of a slight difference in properties that appears for each production lot.

(Specimen 20)

The specimen 20 is prepared for the purpose of pathological diagnosis or the like from a specimen or a tissue sample collected from a human body. The specimen 20 may be a tissue section, a cell, or a fine particle, and regarding the specimen 20, the type of tissue used (for example, an organ or the like), the type of target disease, the attribute of the subject (for example, age, sex, blood type, race, or the like), or the lifestyle of the subject (for example, dietary habits, exercise habits, smoking habits, or the like) is not particularly limited. Note that the tissue section may include, for example, a section before staining of a tissue section to be stained (hereinafter, also simply referred to as a section), a section adjacent to the stained section, a section different from the stained section in the same block (sampled from the same place as the stained section), a section in a different block in the same tissue (sampled from a different place from the stained section), a section collected from a different patient, or the like. In addition, the specimen 20 is managed with identification information (hereinafter, referred to as "specimen identification information 21") that can identify each specimen 20. Similarly to the reagent identification information 11, the specimen identification information 21 is, for example, bar code information (one-dimensional bar code information, two-dimensional bar code information, or the like), but is not limited thereto. The properties of the specimen 20 vary depending on the type of tissue used, the type of the target disease, the attribute of the subject, the lifestyle of the subject, or the like. For example, in the specimen 20, a measurement channel, a spectrum, or the like varies depending on the type of tissue used or the like. Therefore, in the information processing system according to the present embodiment, the specimen 20 is individually managed by being attached with the specimen identification information 21. As a result, the information processing apparatus 100 can perform fluorescence separation in consideration of a slight difference in properties that appears for each specimen 20.

(Fluorescent Stained Specimen 30)

The fluorescent stained specimen 30 is prepared by staining the specimen 20 with the fluorescent reagent 10. In the present embodiment, for the fluorescent stained specimen 30, it is assumed that the specimen 20 is stained with one or more fluorescent reagents 10, but the number of fluorescent reagents 10 used for staining is not particularly limited. In addition, the staining method is determined by, for example, a combination of the specimen 20 and the fluorescent reagent 10, and is not particularly limited.

(Information Processing Apparatus 100)

As illustrated in FIG. 1, the information processing apparatus 100 includes an acquisition unit 110, a storage unit 120, a processing unit 130, a display unit 140, a control unit 150, and an operation unit 160. The information processing apparatus 100 may be, for example, a fluorescence microscope or the like, but is not necessarily limited thereto, and may include various apparatuses. For example, the information processing apparatus 100 may be a personal computer (PC) or the like.

(Acquisition Unit 110)

The acquisition unit 110 is configured to acquire information used for various types of processing of the information processing apparatus 100. As illustrated in FIG. 1, the acquisition unit 110 includes an information acquisition unit 111 and a fluorescence signal acquisition unit 112.

(Information Acquisition Unit 111)

The information acquisition unit 111 is configured to acquire information (hereinafter, referred to as "reagent information") on the fluorescent reagent 10 and information (hereinafter, referred to as "specimen information") on the specimen 20. More specifically, the information acquisition unit 111 acquires the reagent identification information 11 attached to the fluorescent reagent 10 used for generating the fluorescent stained specimen 30 and the specimen identification information 21 attached to the specimen 20. For example, the information acquisition unit 111 acquires the reagent identification information 11 and the specimen identification information 21 using a bar code reader or the like. Then, the information acquisition unit 111 acquires the reagent information based on the reagent identification information 11 and the specimen information based on the specimen identification information 21 from the database 200. The information acquisition unit 111 stores the acquired information in an information storage unit 121 described later.

(Fluorescence Signal Acquisition Unit 112)

The fluorescence signal acquisition unit 112 is configured to acquire a plurality of fluorescence signals respectively corresponding to a plurality of excitation light when the fluorescent stained specimen 30 (prepared by staining the specimen 20 with the fluorescent reagent 10) is irradiated with a plurality of excitation light having different wavelengths. More specifically, the fluorescence signal acquisition unit 112 receives light and outputs a detection signal corresponding to the amount of received light to acquire the fluorescence spectrum of the fluorescent stained specimen 30 based on the detection signal. Here, the contents of the excitation light (including the excitation wavelength, the intensity, and the like) are determined on the basis of reagent information and the like (in other words, information on the fluorescent reagent 10, and the like). Note that the fluorescence signal herein is not particularly limited as long as it is a signal derived from fluorescence, and may be, for example, a fluorescence spectrum.

FIGS. 2A, 2B, 2C, and 2D are specific examples of fluorescence spectra acquired by the fluorescence signal acquisition unit 112. In FIGS. 2A, 2B, 20, and 2D, the fluorescent stained specimen 30 contains four fluorescent substances of DAPI, CK/AF488, PgR/AF594, and ER/AF647, and specific examples of fluorescence spectra acquired when irradiated with excitation light having excitation wavelengths of 392 [nm] (FIG. 2A), 470 [nm] (FIG. 2B), 549 [nm] (FIG. 2C), and 628 [nm] (FIG. 2D) are illustrated. Note that the fluorescence wavelength is shifted to a longer wavelength side than the excitation wavelength due to the emission of energy for fluorescence emission (Stokes shift). In addition, the fluorescent substance contained in the fluorescent stained specimen 30 and the excitation wavelength of the excitation light to be irradiated are not limited to the above. The fluorescence signal acquisition unit 112 stores the acquired fluorescence spectrum in a fluorescence signal storage unit 122 described later.

(Storage Unit 120)

The storage unit 120 is configured to store information used for various types of processing of the information processing apparatus 100 or information output by the various types of processing. As illustrated in FIG. 1, the storage unit 120 includes an information storage unit 121, a fluorescence signal storage unit 122, and a fluorescence separation result storage unit 123.

(Information Storage Unit 121)

The information storage unit 121 is configured to store the reagent information and the specimen information acquired by the information acquisition unit 111.

(Fluorescence Signal Storage Unit 122)

The fluorescence signal storage unit 122 is configured to store the fluorescence signal of the fluorescent stained specimen 30 acquired by the fluorescence signal acquisition unit 112.

(Fluorescence Separation Result Storage Unit 123)

The fluorescence separation result storage unit 123 is configured to store the result of the fluorescence separation processing performed by a separation processing unit 131 described later. For example, the fluorescence separation result storage unit 123 stores the fluorescence signal for each fluorescent reagent or the autofluorescence signal of the specimen 20 separated by the separation processing unit 131. In addition, the fluorescence separation result storage unit 123 separately provides the result of the fluorescence separation processing to the database 200 as teacher data in machine learning in order to improve the fluorescence separation accuracy by machine learning or the like. Note that, after providing the result of the fluorescence separation processing to the database 200, the fluorescence separation result storage unit 123 may increase the free space by appropriately deleting the processing result stored therein.

(Processing Unit 130)

The processing unit 130 is configured to perform various types of processing including fluorescence separation processing. As illustrated in FIG. 1, the processing unit 130 includes a separation processing unit 131, an image generation unit 132, and a model generation unit 133.

(Separation Processing Unit 131)

The separation processing unit 131 is configured to perform fluorescence separation processing by using an inference model using image information, specimen information, reagent information, and the like as inputs.

As the image information, for example, a fluorescence signal (a two-dimensional image based on a fluorescence signal; hereinafter, referred to as a fluorescent stained image) acquired by imaging the fluorescent stained specimen 30 by the fluorescence signal acquisition unit 112 may be used.

As the specimen information, for example, an autofluorescence spectrum of each molecule included in the specimen 20 specified from the specimen identification information 21 and morphological information regarding the specimen 20 may be used. Note that the morphological information may be a bright field image, an unstained image, and staining information of the same tissue block, and may be, for example, an expression map of a target in the specimen 20.

Here, the expression map of the target may include, for example, information on distribution (shape or the like) of the target such as tissue, cell, or nucleus, information on tissue in each region, information on what cell is located where, and the like. For example, the expression map of the target may be a bright field image obtained by imaging the target, or may be a binary mask in which the expression map of the target is represented by a binary value.

Note that the target in the present description may include a nucleic acid or the like in addition to an antigen such as a protein or a peptide. That is, in the present embodiment, the type of the target is not limited, and various substances that can be targeted can be targeted.

In addition, the same tissue block may be a specimen same as or similar to the specimen 20 or the fluorescent stained specimen 30.

Here, for the specimen same as or similar to the specimen 20 or the fluorescent stained specimen 30, either an unstained section or a stained section can be used. For example, when an unstained section is used, a section before staining used as a stained section, a section adjacent to the stained section, a section different from the stained section in the same block (sampled from the same place as the stained section), a section in a different block in the same tissue (sampled from a different place from the stained section), or the like can be used.

As the reagent information, for example, a fluorescence spectrum (hereinafter, referred to as a standard spectrum or a reference spectrum) for each fluorescent reagent 10 used for staining the specimen 20 may be used. For example, various fluorescence spectra such as a fluorescence spectrum based on a catalog value provided from a reagent vendor or a fluorescence spectrum for each fluorescent reagent 10 extracted from image information obtained by imaging the same or similar fluorescent stained specimen 30 may be applied to the reference spectrum of each fluorescent reagent 10.

The separation processing unit 131 performs processing (fluorescence separation processing) of separating the autofluorescence signal of each molecule included in the specimen 20 and the fluorescence signal of each fluorescent reagent 10 from the image information by inputting the image information, the specimen information, the reagent information, and the like to a learned inference model prepared in advance. Note that contents of the fluorescence separation processing using the inference model and learning of the inference model will be described in detail later.

In addition, the separation processing unit 131 may perform various types of processing using the fluorescence signal and the autofluorescence signal obtained by the fluorescence separation processing. For example, the separation processing unit 131 may perform processing of extracting the fluorescence signal from the image information of another specimen 20 by performing subtraction processing (also referred to as "background subtraction processing") on the image information of the other specimen 20 using the autofluorescence signal after separation.

When there are a plurality of specimens 20 that are the same or similar in terms of the tissue used for the specimen 20, the type of the target disease, the attribute of the subject, the lifestyle of the subject, and the like, there is a high possibility that the autofluorescence signals of these specimens 20 are similar. The similar specimens referred to herein include, for example, a tissue section before staining of a tissue section to be stained (hereinafter referred to as a section), a section adjacent to the stained section, a section different from the stained section in the same block (sampled from the same place as the stained section), a section in a different block in the same tissue (sampled from a different place from the stained section) and the like), a section collected from a different patient, or the like. Therefore, when the autofluorescence signal can be extracted from a certain specimen 20, the separation processing unit 131 may extract the fluorescence signal from the image information of another specimen 20 by removing the autofluorescence signal from the image information of the other specimen 20. As described above, by using the background after the autofluorescence signal is removed when the S/N value is calculated using the image information of the other specimen 20, the S/N value in the two-dimensional image obtained by the fluorescence separation can be improved.

Note that, in the present description, the background may be a region not stained with the fluorescent reagent 10 or a signal value in the region. Therefore, the background may include an autofluorescence signal, other noise, and the like before the background subtraction processing is performed. In addition, after the background subtraction processing is performed, an autofluorescence signal that has not been removed, other noises, and the like may be included.

In addition, the separation processing unit 131 can perform various types of processing using the fluorescence signal or autofluorescence signal after separation in addition to the background subtraction processing. For example, the separation processing unit 131 can analyze the immobilized state of the specimen 20 using these signals, and perform segmentation (or region division) for recognizing a region of an object (for example, a cell, intracellular structure (cytoplasm, cell membrane, nucleus, etc.), or tissue (tumor site, non-tumor site, connective tissue, blood vessel, blood vessel wall, lymphatic vessel, fibrous structure, necrosis, and the like)) included in the image information.

(Image Generation Unit 132)

The image generation unit 132 is configured to generate (reconstruct) image information on the basis of the fluorescence signal or the autofluorescence signal separated by the separation processing unit 131. For example, the image generation unit 132 can generate image information including only the fluorescence signal or generate image information including only the autofluorescence signal. At that time, in a case where the fluorescence signal is constituted by a plurality of fluorescent components or the autofluorescence signal is constituted by a plurality of autofluorescent components, the image generation unit 132 can generate image information in units of respective components. Furthermore, in a case where the separation processing unit 131 performs various types of processing (for example, analysis of the immobilized state of the specimen 20, segmentation, calculation of the S/N value, or the like) using the fluorescence signal or autofluorescence signal after separation, the image generation unit 132 may generate image information indicating the results of the processing. According to the present configuration, the distribution information of the fluorescent reagent 10 labeled with the target molecule or the like, that is, the two-dimensional spread and intensity of fluorescence, the wavelength, and the positional relationship thereof are visualized, and in particular, in the tissue image analysis region in which the information of the target substance is complicated, the visibility of the doctor or the researcher who is the user can be improved.

In addition, the image generation unit 132 may generate the image information by controlling the fluorescence signal for the autofluorescence signal to be distinguished on the basis of the fluorescence signal or the autofluorescence signal separated by the separation processing unit 131. Specifically, the image information may be generated by controlling, for example, improving the luminance of the fluorescence spectrum of the fluorescent reagent 10 labeled with the target molecule or the like, extracting and changing the color of only the fluorescence spectrum of the labeled fluorescent reagent 10, extracting the fluorescence spectrum of two or more fluorescent reagents 10 from the specimen 20 labeled with two or more fluorescent reagents 10 and changing each of the fluorescence spectra to different colors, extracting and dividing or subtracting only the autofluorescence spectrum of the specimen 20, and improving the dynamic range. As a result, the user can clearly distinguish the color information derived from the fluorescent reagent bound to the target substance, and the visibility of the user can be improved.

(Model Generation Unit 133)

The model generation unit 133 is configured to generate an inference model to be used in the fluorescence separation processing performed by the separation processing unit 131, and update parameters of the inference model by machine learning to improve the fluorescence separation accuracy.

(Display Unit 140)

The display unit 140 is configured to present the image information generated by the image generation unit 132 to the implementer by displaying the image information on the display. Note that the type of display used as the display unit 140 is not particularly limited. In addition, although not described in detail in the present embodiment, the image information generated by the image generation unit 132 may be presented to the implementer by being projected by a projector or printed by a printer (in other words, a method of outputting the image information is not particularly limited).

(Control Unit 150)

The control unit 150 is a functional configuration that comprehensively controls overall processing performed by the information processing apparatus 100. For example, the control unit 150 controls the start, end, and the like of various types of processing (for example, imaging processing of the fluorescent stained specimen 30, fluorescence separation processing, various analysis processing, image information generation processing (image information reconstruction processing), image information display processing, and the like) as described above on the basis of an operation input by the user performed via the operation unit 160. Note that the control contents of the control unit 150 are not particularly limited. For example, the control unit 150 may control processing (for example, processing related to an operating system (OS)) generally performed in a general-purpose computer, a PC, a tablet PC, or the like.

(Operation Unit 160)

The operation unit 160 is configured to receive an operation input from an implementer. More specifically, the operation unit 160 includes various input means such as a keyboard, a mouse, a button, a touch panel, or a microphone, and the implementer can perform various inputs to the information processing apparatus 100 by operating these input means. Information regarding the operation input performed via the operation unit 160 is provided to the control unit 150.

(Database 200)

The database 200 is a device that accumulates and manages specimen information, reagent information, results of fluorescence separation processing, and the like. More specifically, the database 200 manages the specimen identification information 21 and the specimen information, and the reagent identification information 11 and the reagent information in association with each other. As a result, the information acquisition unit 111 can acquire the specimen information based on the specimen identification information 21 of the specimen 20 to be measured and the reagent information based on the reagent identification information 11 of the fluorescent reagent 10 from the database 200.

As described above, the specimen information managed by the database 200 is information including the measurement channel and the spectrum information (autofluorescence spectrum) unique to the autofluorescent component included in the specimen 20. However, in addition to these, the specimen information may include target information for each specimen 20, specifically, information regarding the type of the tissue used (for example, organs, cells, blood, body fluids, ascites fluid, pleural fluid, and the like), the type of the target disease, the attribute (for example, age, sex, blood type, race, etc.) of the subject, or the lifestyle (for example, dietary habits, exercise habits, smoking habits, or the like) of the subject, and the information including the measurement channel and the spectrum information unique to the autofluorescent component included in the specimen 20 and the target information may be associated with each specimen 20. As a result, the information including the measurement channel and the spectrum information unique to the autofluorescence component included in the specimen 20 can be easily traced from the target information, and for example, the separation processing unit 131 can be caused to perform similar separation processing performed in the past from the similarity of the target information in the plurality of specimens 20, and the measurement time can be shortened. Note that the "used tissue" is not particularly limited to a tissue collected from a subject, and may include an in vivo tissue or a cell line of a human, an animal, or the like, a solution, a solvent, a solute, and a material contained in an object to be measured.

In addition, the reagent information managed by the database 200 is the information including the spectrum information (fluorescence spectrum) of the fluorescent reagent 10 as described above, but in addition to this, the reagent information may include information regarding the fluorescent reagent 10 such as a production lot, a fluorescent component, an antibody, a clone, a fluorescent labeling index, a quantum yield, a fading coefficient (information indicating easiness of reducing fluorescence intensity of the fluorescent reagent 10), and an absorption cross-sectional area (or molar absorption coefficient). Furthermore, the specimen information and the reagent information managed by the database 200 may be managed in different configurations, and in particular, the information regarding the reagent may be a reagent database that presents an optimal combination of reagents to the user.

Here, it is assumed that the specimen information and the reagent information are provided from a manufacturer (maker) or the like, or are independently measured in the information processing system according to the present disclosure. For example, the manufacturer of the fluorescent reagent 10 often does not measure and provide spectrum information, a fluorescent labeling index, and the like for each production lot. Therefore, by independently measuring and managing these pieces of information in the information processing system according to the present disclosure, the separation accuracy between the fluorescence signal and the autofluorescence signal can be improved. In addition, in order to simplify the management, the database 200 may use a catalog value disclosed by a manufacturer (maker) or the like, a document value described in various documents, or the like, as the specimen information and the reagent information (particularly, reagent information). However, in general, since the actual specimen information and reagent information are often different from the catalog value and the document value, it is more preferable that the specimen information and the reagent information be independently measured and managed in the information processing system according to the present disclosure as described above.

In addition, the accuracy of the fluorescence separation processing can be improved by a machine learning technique or the like using the specimen information, the reagent information, and the result of the fluorescence separation processing managed in the database 200. In the present embodiment, learning using a machine learning technique or the like is performed in the model generation unit 133. For example, the model generation unit 133 uses a neural network to generate a classifier or an estimator (inference model) machine-learned by learning data in which a fluorescence signal and an autofluorescence signal after separation are associated with image information, specimen information, and reagent information used for separation. Then, in a case where the image information, the specimen information, and the reagent information are newly acquired, the model generation unit 133 can predict and output the fluorescence signal and the autofluorescence signal included in the image information by inputting these pieces of information to the inference model.

In addition, a method of calculating similar fluorescence separation processing performed in the past (fluorescence separation processing using similar image information, specimen information, or reagent information) with higher accuracy than the predicted fluorescence signal and the autofluorescence signal, statistically or regressively analyzing the contents of processing in those processing (information, parameters, and the like used for processing), and improving the fluorescence separation processing of the fluorescence signal and the autofluorescence signal on the basis of the analysis result may be output. Note that the machine learning method is not limited to the above, and a known machine learning technique can be used. In addition, fluorescence separation processing of the fluorescence signal and the autofluorescence signal may be performed by artificial intelligence. In addition, not only the fluorescence separation processing of the fluorescence signal and the autofluorescence signal but also various types of processing (for example, analysis of the immobilized state of the specimen 20, segmentation, or the like) using the fluorescence signal or autofluorescence signal after separation may be improved by a machine learning technique or the like.

The configuration example of the information processing system according to the present embodiment has been described above. Note that the above-described configuration described with reference to FIG. 1 is merely an example, and the configuration of the information processing system according to the present embodiment is not limited to such an example. For example, the information processing apparatus 100 may not necessarily include all of the configurations illustrated in FIG. 1, or may include a configuration not illustrated in FIG. 1.

Here, the information processing system according to the present embodiment may include an imaging device (for example, including a scanner or the like) that acquires a fluorescence spectrum, and an information processing apparatus that performs processing using the fluorescence spectrum. In this case, the fluorescence signal acquisition unit 112 illustrated in FIG. 1 can be implemented by an imaging device, and other configurations can be implemented by an information processing apparatus. In addition, the information processing system according to the present embodiment may include an imaging device that acquires a fluorescence spectrum and software used for processing using the fluorescence spectrum. In other words, the physical configuration (for example, a memory, a processor, or the like) for storing and executing the software may not be provided in the information processing system. In this case, the fluorescence signal acquisition unit 112 illustrated in FIG. 1 can be implemented by an imaging device, and other configurations can be implemented by an information processing apparatus on which the software is performed. Then, the software is provided to the information processing apparatus via a network (for example, from a website, a cloud server, or the like) or provided to the information processing apparatus via an arbitrary storage medium (for example, a disk or the like). In addition, the information processing apparatus on which the software is performed may be various servers (for example, a cloud server or the like), a general-purpose computer, a PC, a tablet PC, or the like. Note that the method by which the software is provided to the information processing apparatus and the type of the information processing apparatus are not limited to the above. In addition, it should be noted that the configuration of the information processing system according to the present embodiment is not necessarily limited to the above, and a configuration that can be conceived by a person skilled in the art can be applied on the basis of the technical level at the time of use.

2.2. Application Example to Microscope System

The information processing system described above may be implemented as, for example, a microscope system. Therefore, next, a configuration example of a microscope system in a case where the information processing system according to the present embodiment is implemented as a microscope system will be described with reference to FIG. 3.

Figure 3:
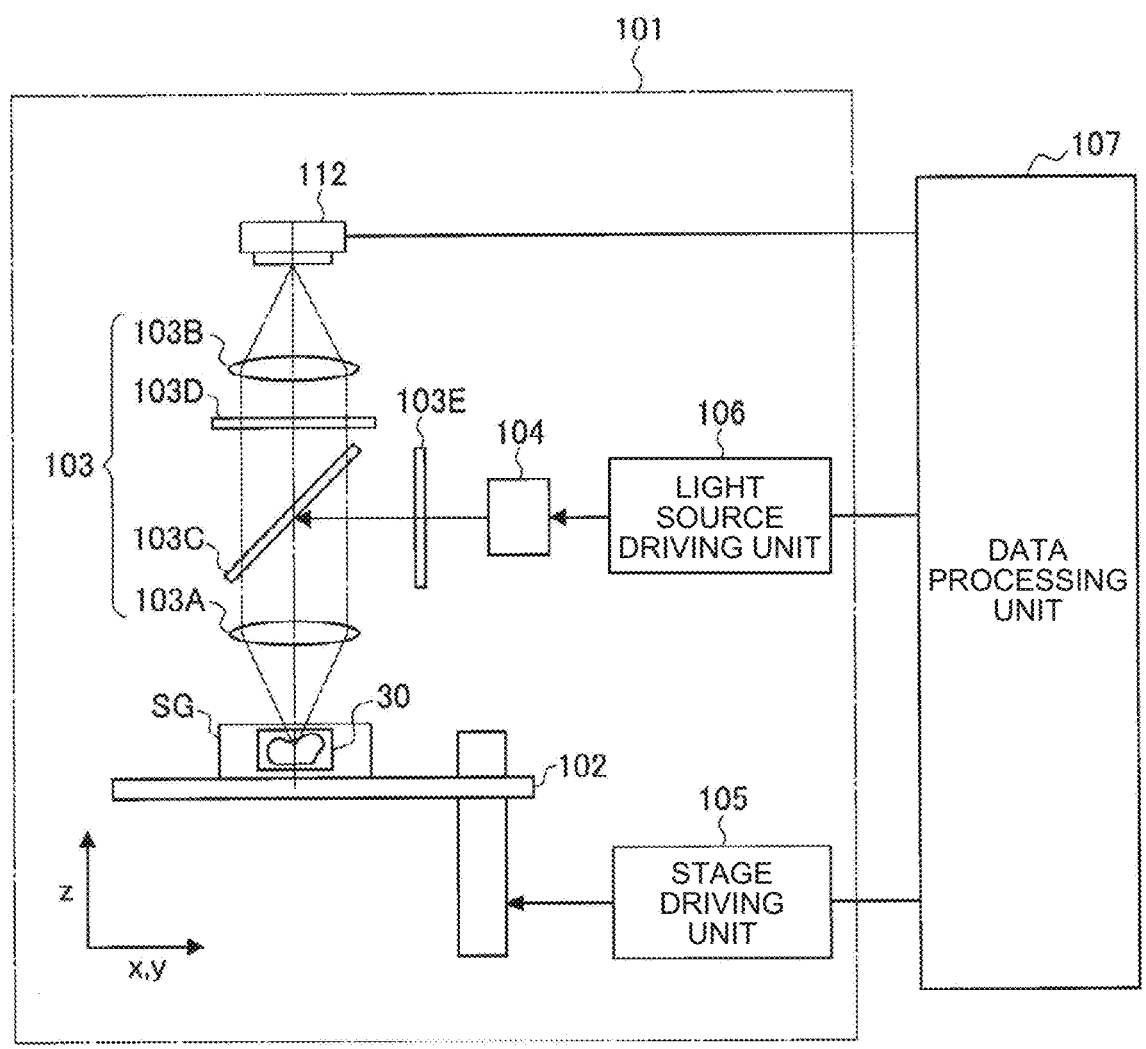
FIG. 3 is a block diagram illustrating a configuration example of a microscope system in a case where the information processing system according to the first embodiment is implemented as the microscope system.

As illustrated in FIG. 3, the microscope system according to the present embodiment includes a microscope 101 and a data processing unit 107.

The microscope 101 includes a stage 102, an optical system 103, a light source 104, a stage driving unit 105, a light source driving unit 106, and a fluorescence signal acquisition unit 112.

The stage 102 has a placement surface on which the fluorescent stained specimen 30 can be placed, and is movable in a direction parallel to the placement surface (x-y plane direction) and a direction perpendicular to the placement surface (z-axis direction) by driving of the stage driving unit 105. The fluorescent stained specimen 30 has a thickness of, for example, several μm to several tens μm in the Z direction, and is fixed by a predetermined fixing method while being sandwiched between a slide glass SG and a cover glass (not illustrated).

The optical system 103 is disposed above the stage 102. The optical system 103 includes an objective lens 103A, an imaging lens 103B, a dichroic mirror 103C, an emission filter 103D, and an excitation filter 103E. The light source 104 is, for example, a light bulb such as a mercury lamp, a light emitting diode (LED), or the like, and emits excitation light to the fluorescent label attached to the fluorescent stained specimen 30 by driving of the light source driving unit 106.

When obtaining a fluorescence image of the fluorescent stained specimen 30, the excitation filter 103E generates excitation light by transmitting only light having an excitation wavelength for exciting the fluorescent dye among the light emitted from the light source 104. The dichroic mirror 103C reflects the excitation light transmitted through and incident on the excitation filter and guides the reflected excitation light to the objective lens 103A. The objective lens 103A condenses the excitation light on the fluorescent stained specimen 30. Then, the objective lens 103A and the imaging lens 103B magnify the image of the fluorescent stained specimen 30 to a predetermined magnification, and form the magnified image on the imaging surface of the fluorescence signal acquisition unit 112.

When the fluorescent stained specimen 30 is irradiated with excitation light, the stain bound to each tissue of the fluorescent stained specimen 30 emits fluorescence. This fluorescence is transmitted through the dichroic mirror 103C via the objective lens 103A and reaches the imaging lens 103B via the emission filter 103D. The emission filter 103D absorbs the light magnified by the objective lens 103A and transmitted through the excitation filter 103E, and transmits only a part of the coloring light. As described above, the image of the coloring light in which the external light is lost is magnified by the imaging lens 103B and formed on the fluorescence signal acquisition unit 112.

The data processing unit 107 is configured to drive the light source 104, acquire the fluorescence image of the fluorescent stained specimen 30 using the fluorescence signal acquisition unit 112, and perform various types of processing using the fluorescence image. More specifically, the data processing unit 107 can function as some or all of the configurations of the information acquisition unit 111, the storage unit 120, the processing unit 130, the display unit 140, the control unit 150, the operation unit 160, or the database 200 of the information processing apparatus 100 described with reference to FIG. 1. For example, the data processing unit 107 functions as the control unit 150 of the information processing apparatus 100, thereby controlling the driving of the stage driving unit 105 and the light source driving unit 106 and controlling the acquisition of the spectrum by the fluorescence signal acquisition unit 112.

The configuration example of the microscope system in a case where the information processing system according to the present embodiment is implemented as the microscope system has been described above. Note that the above-described configuration described with reference to FIG. 3 is merely an example, and the configuration of the microscope system according to the present embodiment is not limited to such an example. For example, the microscope system may not necessarily include all of the configurations illustrated in FIG. 3, or may include configurations not illustrated in FIG. 3.

2.3. Processing Flow

The configuration example of the information processing system according to the present embodiment has been described above. Next, an example of a flow of various types of processing by the information processing apparatus 100 will be described with reference to FIG. 4.

In step S1000, the user determines the fluorescent reagent 10 and the specimen 20 to be used for analysis. In step S1004, the user stains the specimen 20 using the fluorescent reagent 10 to create the fluorescent stained specimen 30.

In step S1008, the fluorescence signal acquisition unit 112 of the information processing apparatus 100 images the fluorescent stained specimen 30 to acquire image information (for example, a fluorescent stained image) and part of the specimen information (for example, morphological information). In step S1012, the information acquisition unit 111 acquires the reagent information (for example, fluorescence spectrum) and part of the specimen information (for example, autofluorescence spectrum) from the database 200 based on the reagent identification information 11 attached to the fluorescent reagent 10 used for generating the fluorescent stained specimen 30 and the specimen identification information 21 attached to the specimen 20.

In step S1016, the separation processing unit 131 acquires the inference model from the database 200 or the model generation unit 133. In step S1020, the separation processing unit 131 inputs the image information, the reagent information, and the specimen information to the inference model, and acquires image information (two-dimensional image) for each fluorescent reagent 10 (or fluorescent dye) as a fluorescence separation result that is an output thereof.

In step S1024, the image generation unit 132 displays the image information acquired by the separation processing unit 131. As a result, a series of processing flows according to the present embodiment ends.

Figure 4:
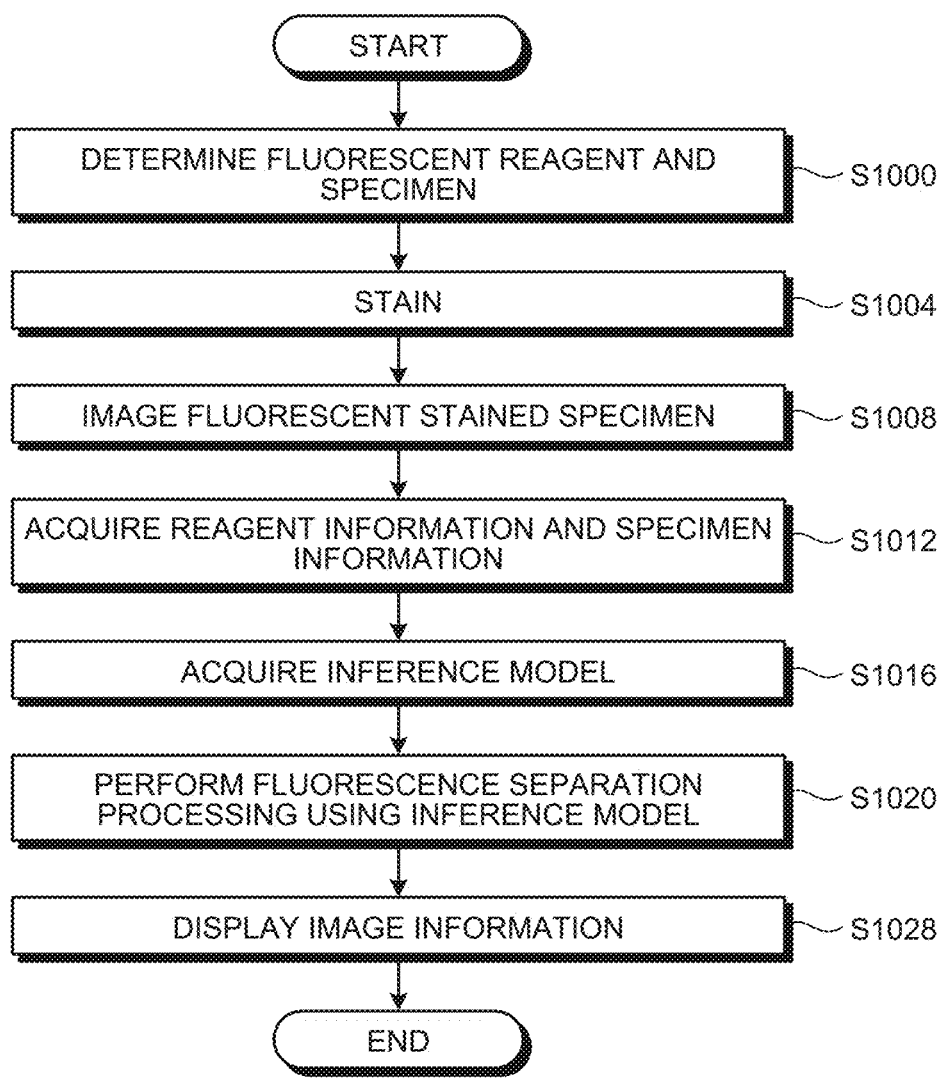
FIG. 4 is a flowchart illustrating a processing flow example of fluorescence separation by an information processing apparatus according to the first embodiment.

Note that each step in the flowchart of FIG. 4 is not necessarily processed in time series in the described order. That is, each step in the flowchart may be processed in an order different from the described order or may be processed in parallel. In addition, the information processing apparatus 100 may also perform processing not illustrated in FIG. 4. For example, the separation processing unit 131 may perform segmentation on the basis of the acquired image information or analyze the immobilized state of the specimen 20, for example.

2.4. Fluorescence Separation Processing

Next, the fluorescence separation processing using the inference model according to the present embodiment will be described in detail with reference to the drawings.

As described above, in the fluorescence separation processing according to the present embodiment, the fluorescence separation accuracy is improved by using the inference model constructed by machine learning. Specifically, in addition to the fluorescent stained image obtained from the fluorescent stained specimen 30, the reference spectrum of each molecule included in the specimen 20, and the reference spectrum of each fluorescent reagent 10, the morphological information of the specimen 20 is also used as an input of the inference model, whereby the fluorescence separation processing is performed in consideration of the shape, type, and the like of cells and tissues constituting the specimen 20.

Note that, as the inference model, for example, a machine learning model using a multilayer neural network such as a deep neural network (DNN), a convolutional neural network (CNN), or a recurrent neural network (RNN) can be used.

Figure 5:
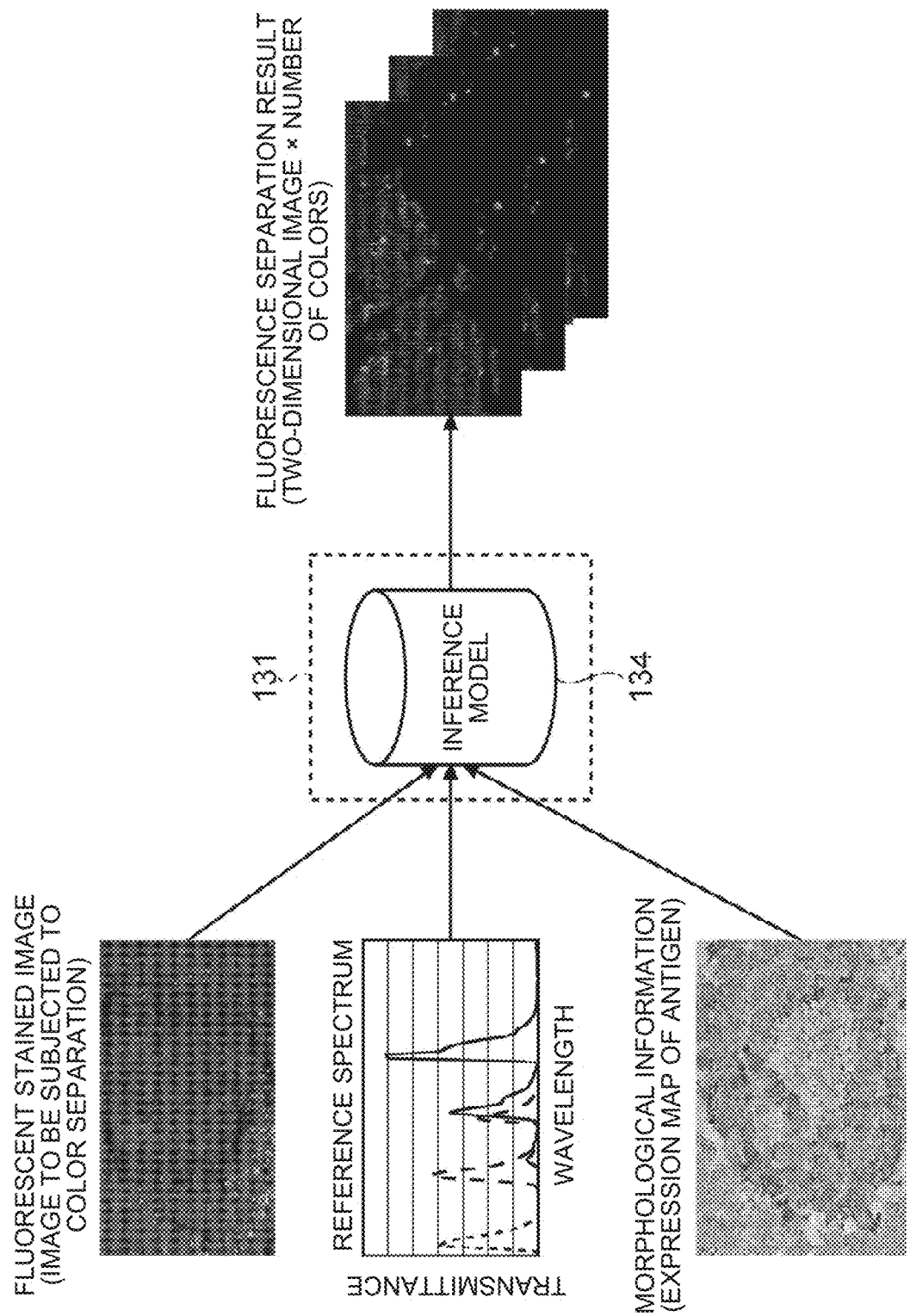
FIG. 5 is a schematic diagram for explaining an example of a flow of fluorescence separation processing using an inference model according to the first embodiment.

FIG. 5 is a schematic diagram for explaining an example of a flow of the fluorescence separation processing using the inference model according to the present embodiment. As illustrated in FIG. 5, in the present embodiment, morphological information is given as an input of an inference model 134 in addition to the fluorescent stained image and the reference spectrum.

The fluorescent stained image may be a two-dimensional image (spectroscopic spectrum data) before fluorescence separation. As described above, the reference spectrum may be the autofluorescence spectrum (for example, a catalog value) of each molecule contained in the specimen 20 and the fluorescence spectrum (for example, a catalog value) of each fluorescent reagent 10.

As described above, the morphological information may be, for example, a bright field image obtained by imaging the specimen 20 before staining, the fluorescent stained specimen 30 after staining, or a specimen or a fluorescent stained specimen similar thereto by the fluorescence signal acquisition unit 112. This bright field image may be, for example, a map (hereinafter, referred to as an expression map of the target) indicating the expression level of the target regardless of whether it is stained, unstained, or fluorescent.

When the fluorescent stained image, the reference spectrum, and the morphological information are given to the input layer, the inference model 134 outputs a two-dimensional image for each fluorescence from the output layer as a result of the fluorescence separation processing.

2.5. Training of Inference Model

Figure 6:
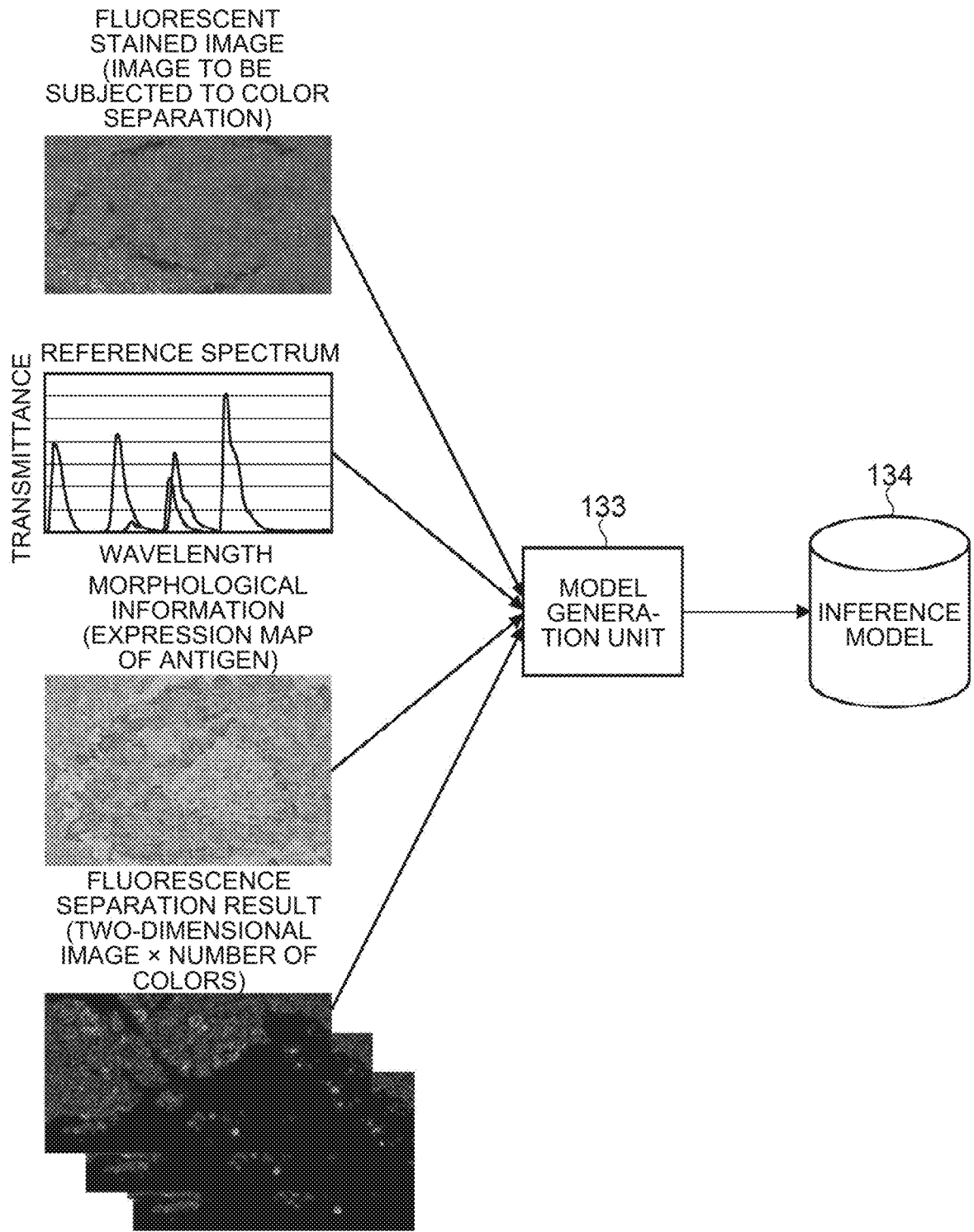
FIG. 6 is a diagram for explaining training of the inference model according to the first embodiment.

FIG. 6 is a diagram for explaining training of an inference model according to the present embodiment. As illustrated in FIG. 6, in the training of the inference model 134, regarding the same specimen 20 (or the fluorescent stained specimen 30), the fluorescent stained image (spectroscopic spectrum data), the reference spectrum, and the morphological image (the expression map of the target), and the two-dimensional image (fluorescence separation result) for each color as the correct image of the fluorescent stained specimen 30 are input to the model generation unit 133 as teacher data (also referred to as training data or learning data). The model generation unit 133 performs training of the inference model 134 by learning and updating parameters of each layer in the inference model 134 by machine learning on the basis of the input teacher data. As a result, the inference model 134 is updated so that the fluorescence separation accuracy is improved.

2.6. Action and Effect

As described above, in the present embodiment, since the fluorescence separation processing is performed using the inference model that inputs the morphological information (the expression map of the target not limited to fluorescence) of the specimen 20 (or the fluorescent stained specimen 30) in addition to the fluorescent stained image (spectroscopic spectrum data) before the fluorescence separation and the reference spectrum, it is possible to obtain a more accurate fluorescence separation result (two-dimensional image for each color) in which the autofluorescence region is clarified and noise is reduced. As a result, it is possible to accurately acquire the target pathological information.

Note that, in the present embodiment, the case where the separation processing unit 131 performs the fluorescence separation processing using the inference model 134 to which the morphological information (expression map of the target not limited to fluorescence) of the specimen 20 (or the fluorescent stained specimen 30) is input has been exemplified, but the present invention is not limited thereto. For example, the separation processing unit 131 may be configured to perform the fluorescence separation processing by LSM or the like using the morphological information.

3. Second Embodiment

Next, an information processing apparatus and an information processing system according to a second embodiment of the present disclosure will be described in detail with reference to the drawings.

The information processing system according to the present embodiment may have a configuration similar to that of the information processing system according to the first embodiment described above, for example. However, in the present embodiment, the separation processing unit 131, the model generation unit 133, and the inference model 134 are replaced with a separation processing unit 231, a model generation unit 233, and an inference model 234, respectively, so that the fluorescence separation processing according to the present embodiment is replaced with processing contents to be described later.

3.1. Fluorescence Separation Processing

Unlike the inference model 134 for performing the fluorescence separation processing, the inference model 234 according to the present embodiment is constructed as an inference model for generating morphological information of the specimen 20 (or the fluorescent stained specimen 30).

Figure 7:
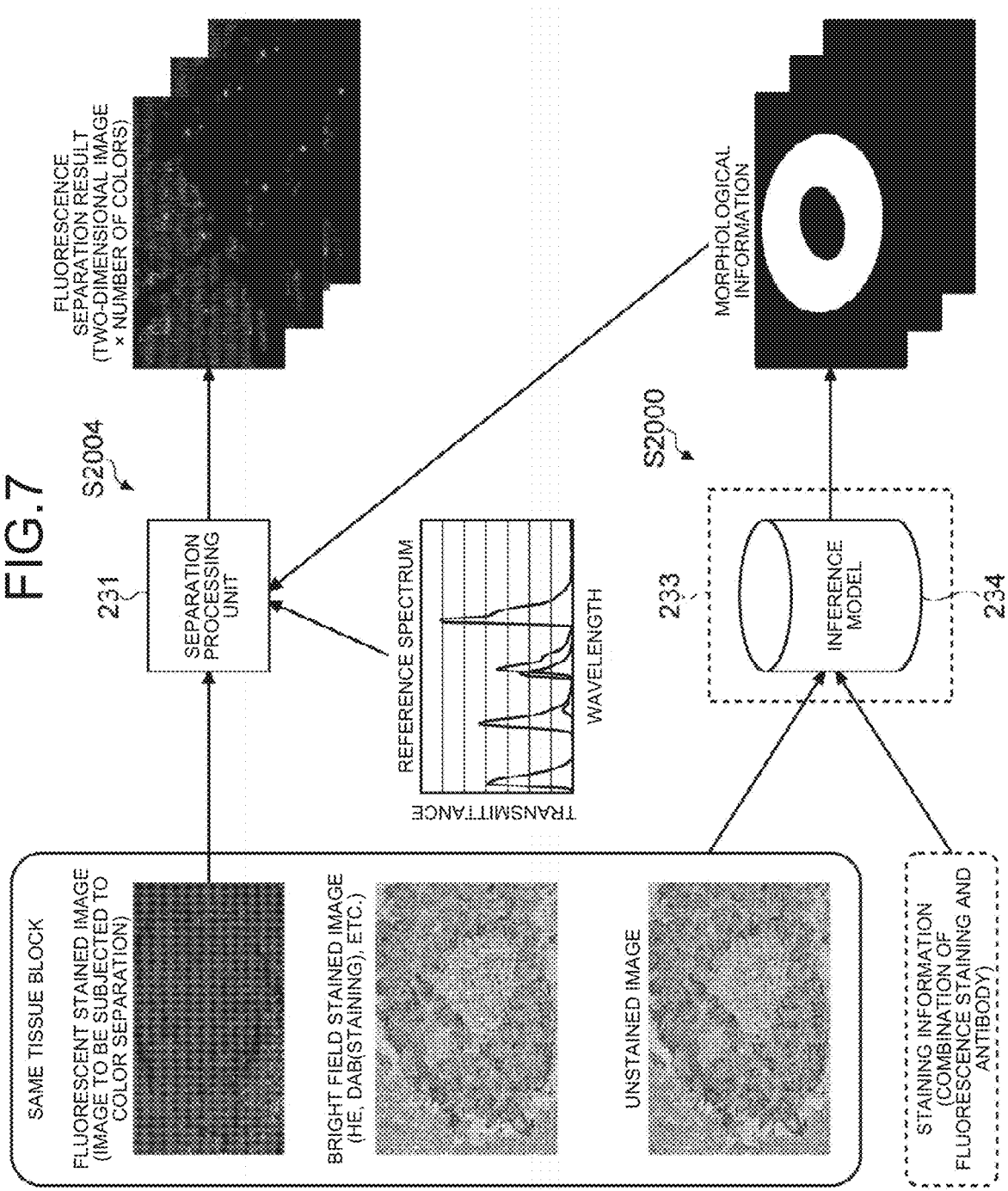
FIG. 7 is a schematic diagram illustrating an example of a flow of fluorescence separation processing using an inference model according to a second embodiment.

FIG. 7 is a schematic diagram illustrating an example of a flow of fluorescence separation processing using the inference model according to the present embodiment. As illustrated in FIG. 7, in the present embodiment, first, in order to generate morphological information (for example, the expression map of the target) of the specimen 20 (or the fluorescent stained specimen 30), regarding the same tissue block, a fluorescent stained image before fluorescence separation (spectroscopic spectrum data) or a fluorescent stained image before fluorescence separation, a bright field image (HE, DAB (immunostaining), etc.), an image (hereinafter, referred to as an unstained image) obtained by, for example, imaging a specimen same as or similar to the unstained specimen 20 by the fluorescence signal acquisition unit 112, and staining information (for example, a combination of a fluorescent dye and an antibody) are input to the inference model 234 of the model generation unit 233. As a result, from the inference model 234, morphological information regarding each combination of the fluorescent dye and the antibody is output as a binary mask (step S2000).

The morphological information generated in this manner is input to the separation processing unit 231. In addition, as in the first embodiment, a fluorescent stained image before fluorescence separation and a reference spectrum are also input to the separation processing unit 231. The separation processing unit 231 performs fluorescence separation on the input fluorescent stained image based on an algorithm such as a least squares method (LSM), a weighted least squares method (WLSM), or a constrained least squares method (CLSM) using the similarly input morphological information and reference spectrum to generate a two-dimensional image for each color (step S2004).

(Separation Processing Unit 231)

Figure 8:
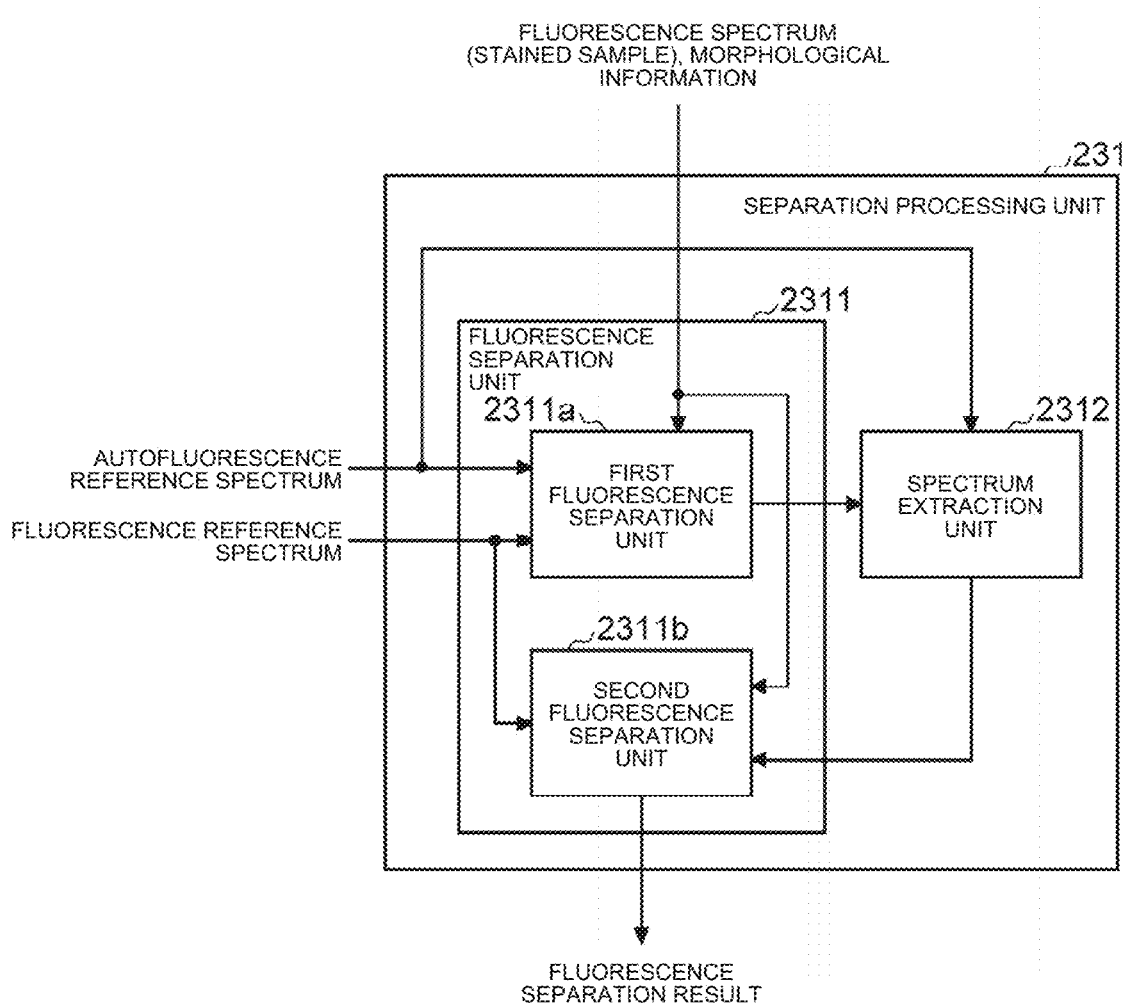
FIG. 8 is a block diagram illustrating a more specific configuration example of a separation processing unit according to the second embodiment.

FIG. 8 is a block diagram illustrating a more specific configuration example of the separation processing unit according to the present embodiment. As illustrated in FIG. 8, the separation processing unit 231 includes a fluorescence separation unit 2311 and a spectrum extraction unit 2312.

The fluorescence separation unit 2311 includes, for example, a first fluorescence separation unit 2311a and a second fluorescence separation unit 2311b, and fluorescently separates the fluorescence spectrum of the fluorescent stained image (hereinafter, also simply referred to as a stained sample) of the stained sample input from the fluorescence signal storage unit 122 for each molecule.

The spectrum extraction unit 2312 is configured to optimize the autofluorescence reference spectrum so that a more accurate fluorescence separation result can be obtained, and adjusts the autofluorescence reference spectrum included in the specimen information input from the information storage unit 121 to one that can obtain a more accurate fluorescence separation result on the basis of the fluorescence separation result by the fluorescence separation unit 2311.

More specifically, the first fluorescence separation unit 2311a performs fluorescence separation processing on the fluorescence spectrum of the input stained sample using the fluorescence reference spectrum included in the reagent information, the autofluorescence reference spectrum included in the specimen information, and the input morphological information, which are input from the information storage unit 121, to separate the fluorescence spectrum into spectra for each molecule. Note that, for the fluores- cence separation processing, for example, a least squares method (LSM), a weighted least squares method (WLSM), or the like may be used.

The spectrum extraction unit 2312 performs spectrum extraction processing using the fluorescence separation result input from the first fluorescence separation unit 2311a on the autofluorescence reference spectrum input from the information storage unit 121, and adjusts the autofluorescence reference spectrum on the basis of the result, thereby optimizing the autofluorescence reference spectrum to one that can obtain a more accurate fluorescence separation result. Note that, for the spectrum extraction processing, for example, non-negative matrix factorization (hereinafter, also referred to as "non-negative matrix factorization (NMF)"), singular value decomposition (SVD), or the like may be used.

The second fluorescence separation unit 2311b performs fluorescence separation processing using the adjusted autofluorescence reference spectrum input from the spectrum extraction unit 2312 and the morphological information on the fluorescence spectrum of the input stained sample, thereby separating the fluorescence spectrum into spectra for each molecule. Note that, as with the first fluorescence separation unit 2311a, for example, a least squares method (LSM), a weighted least squares method (WLSM), or the like may be used for the fluorescence separation processing.

Note that, in FIG. 8, the case where the adjustment of the autofluorescence reference spectrum is performed once has been exemplified, but the present invention is not limited thereto, and the fluorescence separation result by the second fluorescence separation unit 2311b may be input to the spectrum extraction unit 2312, and the processing of performing the adjustment of the autofluorescence reference spectrum again in the spectrum extraction unit 2312 may be repeated one or more times, and then the final fluorescence separation result may be acquired.

3.2. Fluorescence Separation Processing Using Least Squares Method

Next, a fluorescence separation processing using the least squares method will be described. The least squares method calculates the color mixing ratio by fitting the fluorescence spectrum of the input stained sample to the reference spectrum. Note that the color mixing ratio is an index indicating the degree of mixing of the substances. The following formula (1) is a formula representing the residual obtained by subtracting the reference spectrum (St; fluorescence reference spectrum and autofluorescence reference spectrum) mixed at the color mixing ratio a from the fluorescence spectrum (Signal). Note that "Signal (1×number of channels)" in formula (1) indicates that the fluorescence spectrum (Signal) exists as many as the number of channels of the wavelength (for example, Signal is a matrix representing a fluorescence spectrum). In addition, "St (number of substances×number of channels)" indicates that the reference spectrum exists as many as the number of channels of the wavelength for each substance (fluorescent substance and autofluorescent substance) (for example, St is a matrix representing a reference spectrum). In addition, "a (1×number of substances)" indicates that the color mixing ratio a is provided for each substance (fluorescent substance and autofluorescent substance) (for example, a is a matrix representing a color mixing ratio of each reference spectrum in the fluorescence spectrum).

Signal(1×number of channels)−a(1×number of substances)*St(number of substances×number of channels)    (1)

Then, the first fluorescence separation unit 2311a/the second fluorescence separation unit 2311b calculates the color mixing ratio a of each substance having the minimum sum of squares of the residual formula (1). Since the sum of squares of the residual is minimized in a case where the result of partial differentiation regarding the color mixing ratio a is 0 in formula (1) representing the residual, the first fluorescence separation unit 2311a/the second fluorescence separation unit 2311b calculates the color mixing ratio a of each substance in which the sum of squares of the residual is minimized by solving the following formulas (2). Note that "St'" in formula (2) indicates a transposed matrix of the reference spectrum St. In addition, "inv (St*St')" indicates an inverse matrix of St*St'.

$$\frac{\delta(\text{Signal} - a^*St)}{\delta a} = 0 \quad (2)$$

$$\Leftrightarrow 2(\text{Signal} - a^*St)^*St' = 0$$

$$\Leftrightarrow (\text{Signal} - a^*St)St' = 0$$

$$\Leftrightarrow \text{Signal}^*St' - a^*(St^*St') = 0$$

$$\Leftrightarrow a = \text{Signal}^*St'^*inv(St^*St')$$

Here, specific examples of each value of the above formula (1) are expressed in the following formulas (3) to (5). In the examples of the formulas (3) to (5), the reference spectra (St) of three substances (the number of substances is three) are mixed at different color mixing ratios a in the fluorescence spectrum (Signal).

$$St = \begin{pmatrix} 50 & 100 & 60 & 25 & 4 \\ 10 & 20 & 100 & 20 & 8 \\ 0.1 & 11 & 30 & 100 & 50 \end{pmatrix} \quad (3)$$

$$a = (3 \ 2 \ 1) \quad (4)$$

$$\text{Signal} = a^*St = (170.1 \ 351 \ 410 \ 215 \ 78) \quad (5)$$

Then, a specific example of the calculation result of the above formula (2) based on each value of the formulas (3) and (5) is expressed in the following formula (6). As can be seen from formulas (6), "a=(3 2 1)" (that is, the same value as the above formulas (4)) is correctly calculated as the calculation result.

$$a = \text{Signal}^*St'^*inv(St^*St') = (3 \ 2 \ 1) \quad (6)$$

As described above, the first fluorescence separation unit 2311a/the second fluorescence separation unit 2311b performs the fluorescence separation processing using the reference spectrum (the autofluorescence reference spectrum and the fluorescence reference spectrum), so that it is possible to output a unique spectrum as the separation result (the separation result is not known for each excitation wavelength). Therefore, the implementer can more easily obtain the correct spectrum. In addition, since the reference spectrum (autofluorescence reference spectrum) related to autofluorescence used for separation is automatically acquired and fluorescence separation processing is performed, it is not necessary for the implementer to extract a spectrum corresponding to autofluorescence from an appropriate space of an unstained section.

Note that, as described above, the first fluorescence separation unit 2311a/the second fluorescence separation unit 2311b may extract the spectrum for each fluorescent substance from the fluorescence spectrum by performing calculation related to the weighted least square method instead of the least squares method. In the weighted least squares method, by utilizing the fact that the noise of the fluorescence spectrum (Signal), which is a measured value, becomes a Poisson distribution, weighting is performed so as to emphasize an error of a low signal level. However, an upper limit value at which weighting is not performed by the weighted least squares method is set as an Offset value. The Offset value is determined by characteristics of a sensor used for measurement, and in a case where an imaging element is used as a sensor, it is necessary to separately optimize the Offset value. When the weighted least squares method is performed, the reference spectrum St in the above formulas (1) and (2) is replaced with St_ expressed by the following formula (7). Note that the following formula (7) means that St_ is calculated by dividing (in other words, element division) each element (each component) of St represented by the matrix by each corresponding element (each component) in the "Signal+Offset value" also represented by the matrix.

$$St\_ = \frac{St}{\text{Signal} + \text{Offset value}} \quad (7)$$

Here, in a case where the Offset value is 1 and the values of the reference spectrum St and the fluorescence spectrum Signal are respectively expressed by the above formulas (3) and (5), a specific example of St_ expressed by the above formula (7) is expressed by the following formula (8).

$$St\_ = \frac{St}{\text{Signal} + \text{Offset value}} = \begin{pmatrix} 0.2922 & 0.2841 & 0.1460 & 0.1157 & 0.0506 \\ 0.0584 & 0.0568 & 0.2433 & 0.0926 & 0.1013 \\ 5.8445e^{-5} & 0.0313 & 0.0730 & 0.4630 & 0.6329 \end{pmatrix} \quad (8)$$

Then, a specific example of the calculation result of the color mixing ratio a in this case is expressed in the following formula (9). As can be seen from formula (9), "a=(3 2 1)" is correctly calculated as the calculation result.

$$a = \text{Signal}^*St\_'^*inv(St^*St\_') = (3 \ 2 \ 1) \quad (9)$$

The fluorescence separation processing using the least squares method as described above is performed so that there is a correlation between pixels having similar attribute information on the basis of the attribute information (for example, information on which region in the fluorescent stained specimen 30 the pixel belongs to) of each pixel specified from the morphological information, whereby a more accurate fluorescence separation result can be acquired.

3.3. Training of Inference Model

Figure 9:
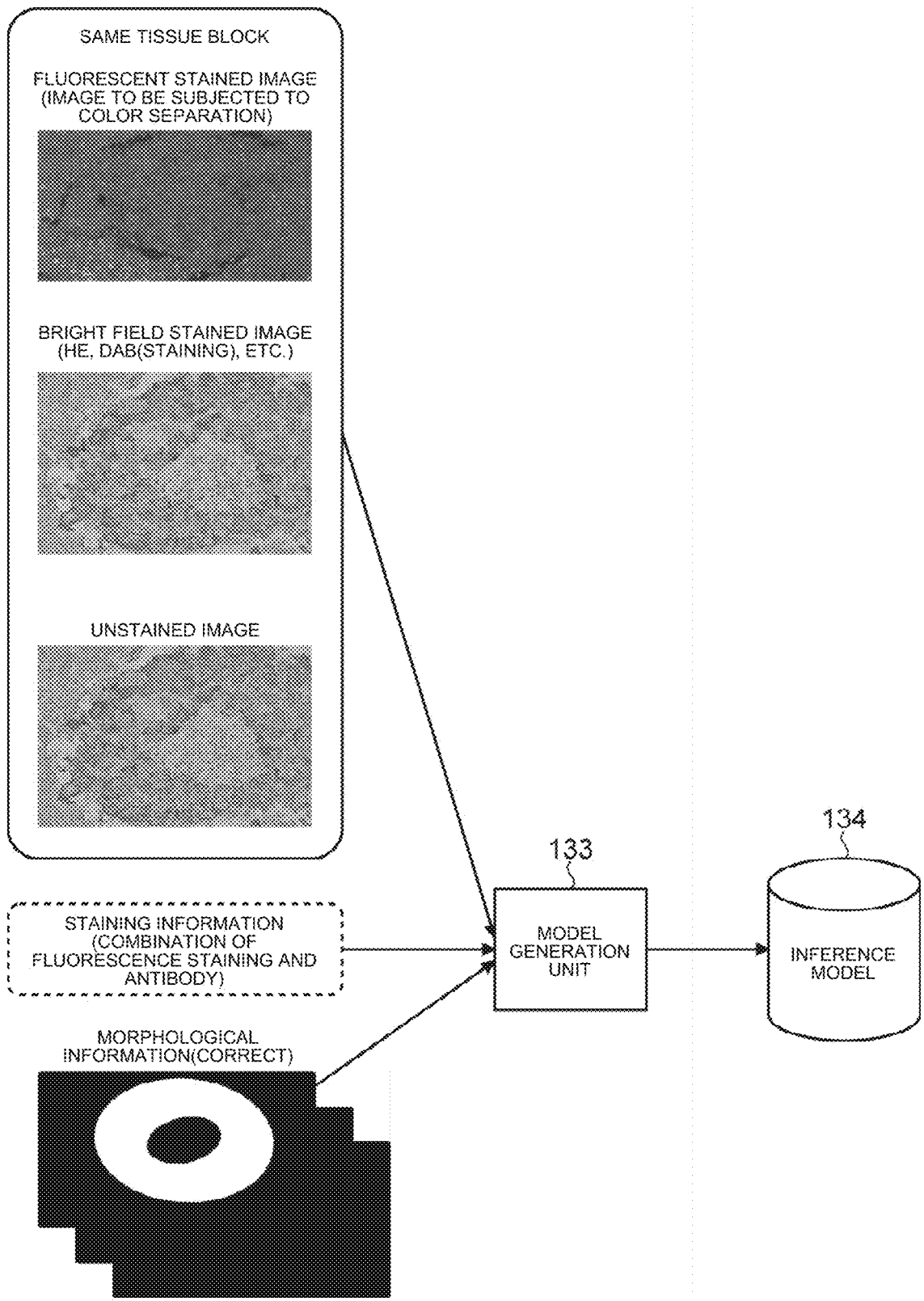
FIG. 9 is a diagram for explaining training of the inference model according to the second embodiment.

In addition, FIG. 9 is a diagram for explaining training of an inference model according to the present embodiment. As illustrated in FIG. 9, in the training of the inference model 234 for generating the morphological information, regarding the same tissue block, a fluorescent stained image before fluorescence separation (spectroscopic spectrum data) or a fluorescent stained image before fluorescence separation, a bright field image (HE, DAB (immunostaining), etc.), an unstained image of a specimen same as or similar to the unstained specimen 20, staining information (for example, a combination of a fluorescent dye and an antibody), and morphological information (binary mask) as a correct image of the specimen 20 (or the fluorescent stained specimen 30) are input to the model generation unit 233 as teacher data. The model generation unit 233 performs training of the inference model 234 by learning and updating parameters of each layer in the inference model 234 by machine learning on the basis of the input teacher data. As a result, the inference model 234 is updated so as to generate more accurate morphological information (binary mask of the expression map of the target).

Note that, in a case where the fluorescent stained image (spectroscopic spectrum data) before the fluorescence separation is input to the inference model 234 to obtain the morphological information, there is a case where the morphology of cells, tissues, or the like in the specimen 20 does not appear in the morphological information under the condition that the specimen 20 is fluorescent stained using a plurality of different types of fluorescent reagents 10. In such a case, before inputting the fluorescent stained image to the inference model 234, fluorescence separation processing using LSM or the like may be performed on the fluorescent stained image first, and the inference model 234 may be trained using the fluorescence separation result.

3.4. Action and Effect

As described above, according to the present embodiment, since the morphological information is generated using the inference model 234 of machine learning that inputs the fluorescent stained image (spectroscopic spectrum data) before the fluorescence separation and the staining information such as the combination of antibody dyes and outputs the morphological information, it is possible to perform the fluorescence separation processing using the morphological information in addition to the reference spectrum in the fluorescence separation processing (S2004) of the subsequent stage. As a result, for example, it is possible to suppress a defect in which the fluorescence separation result differs for each pixel in the region in which one cell is projected.

Other configurations, operations, and effects may be similar to those of the first embodiment described above, and thus detailed description thereof will be omitted here. In addition, in the present embodiment, the case where the fluorescence separation processing performed by the separation processing unit 231 is the fluorescence separation processing using LSM or the like has been exemplified, but the present invention is not limited thereto, and for example, as in the first embodiment, the fluorescence separation processing using the inference model 134 can also be performed.

4. Third Embodiment

In general, image recognition techniques of machine learning include techniques such as classification (classifying whether one image is a cat or a dog), detection (finding a target by a bounding box), and segmentation (obtaining and labeling a region in units of one pixel). As in the second embodiment described above, in a case where morphological information that is a binary mask is generated from an input image, it is necessary to adopt segmentation among the techniques described above. Therefore, in the third embodiment, a procedure for constructing the inference model 234 according to the second embodiment using segmentation will be described with some examples.

4.1. First Procedure Example

Figure 10:
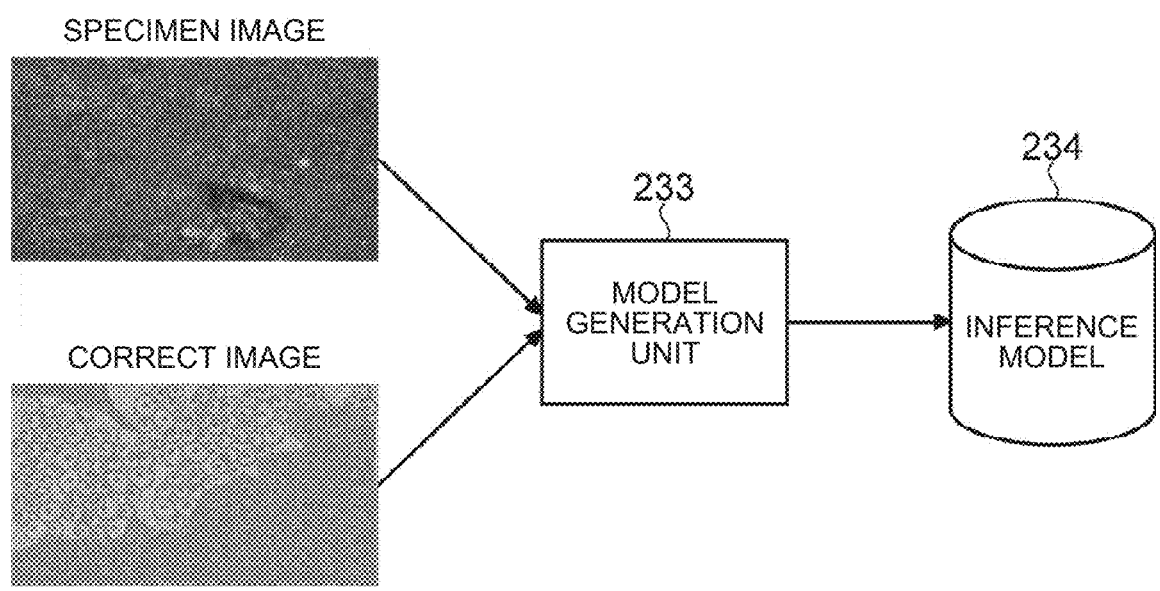
FIG. 10 is a schematic diagram for explaining a method of constructing an inference model according to a first procedure example of a third embodiment.

In the first procedure example, a case where the inference model 234 is constructed in one stage will be described. FIG. 10 is a schematic diagram for explaining a method of constructing an inference model according to the first procedure example of the present embodiment. As illustrated in FIG. 10, in the first procedure example, first, the specimen image and the correct image are input to the model generation unit 233.

Here, the specimen image may be, for example, a fluorescent stained image. This specimen image may be stained or unstained. In addition, in a case where it has been stained, various types of staining such as HE staining and fluorescent antibody staining may be adopted for the staining.

In addition, the correct image may be, for example, morphological information (binary mask of the expression map of the target). This morphological information may be information in which a region such as a tissue, a cell, or a nucleus, or a region such as a combination of an antibody and a fluorescent dye is represented by a binary mask.

For example, the model generation unit 233 performs segmentation in the RNN to acquire and label a region in units of one pixel, thereby learning information of a tissue, a cell, a nucleus, and the like in the specimen image and information of a combination of an antibody and fluorescence. As a result, the inference model 234 for outputting the morphological information is constructed as the product.

In such a one-stage construction method, it is possible to obtain an advantage that morphological information that is an output can be obtained by one inference model 234.

4.2. Second Procedure Example

Figure 11:
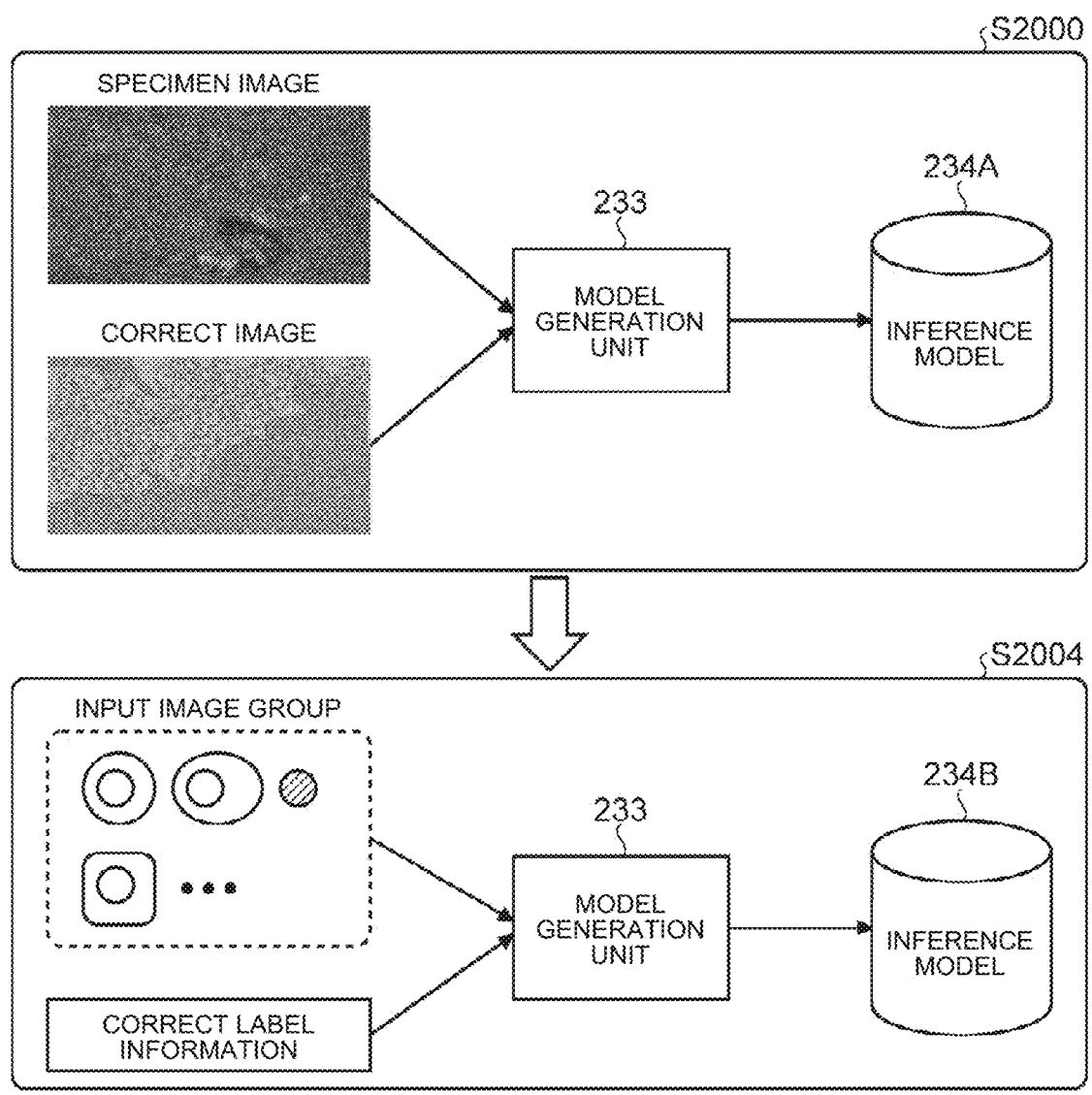
FIG. 11 is a schematic diagram for explaining a method of constructing an inference model according to a second procedure example of the third embodiment.

In the second procedure example, a case where the inference model 234 is constructed in two stages will be described. FIG. 11 is a schematic diagram for explaining a method of constructing an inference model according to the second procedure example of the present embodiment. As illustrated in FIG. 11, in the second procedure example, step S3000 in which the specimen image and the correct image are input to the model generation unit 233 and an inference model 234A is constructed as a product thereof, and step S3004 in which an input image group including individual images such as tissues, cells, and nuclei and correct label information are input to the model generation unit 233 and an inference model 234B is constructed as a product thereof are performed.

In step S3000, the model generation unit 233 acquires a region of a tissue, a cell, a nucleus, or the like in the specimen image, for example, by performing segmentation in the RNN and performing region acquisition and labeling in units of one pixel. As a result, the inference model 234A for outputting the morphological information is constructed as the product.

Then, in step S3004, the model generation unit 233 learns information on the combination of the antibody and the fluorescence by, for example, performing classification on each of the regions acquired in step S3000. As a result, the inference model 234B for outputting the morphological information is constructed as the product.

According to such a two-stage construction method, it is possible to obtain an advantage that it is possible to cope with a case where the information regarding the combination of the antibody and the fluorescence is changed by replacing only the second-stage inference model 234B. That is, there is an advantage that the inference model can be easily changed as compared with the one-stage construction method according to the first procedure example.

5. Fourth Embodiment

In the second embodiment described above, the case of extracting the spectrum for each fluorescent substance from the fluorescence spectrum by performing the fluorescence separation processing using the autofluorescence reference spectrum (and the fluorescence reference spectrum) has been exemplified. Meanwhile, in the fourth embodiment, a case where a fluorescence spectrum for each fluorescent substance is extracted directly from a stained section will be exemplified.

Figure 12:
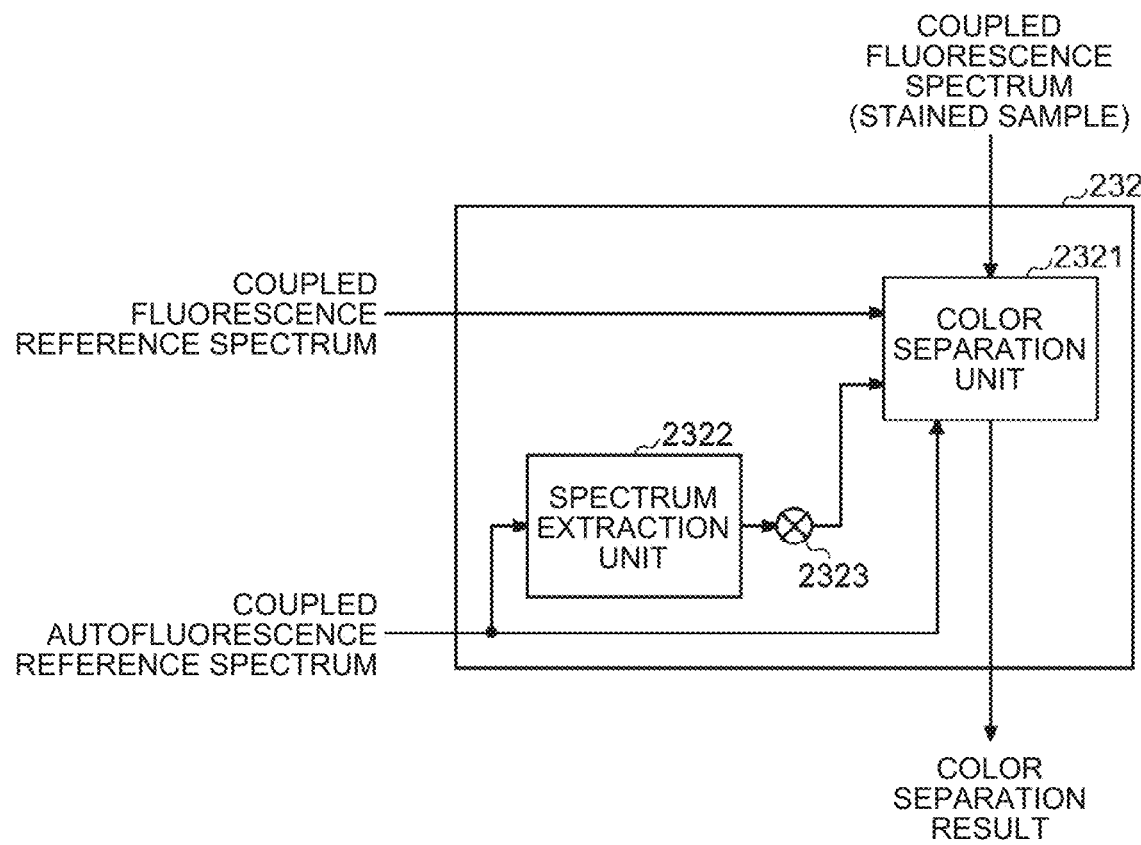
FIG. 12 is a block diagram illustrating a schematic configuration example of a separation processing unit according to a fourth embodiment.

FIG. 12 is a block diagram illustrating a schematic configuration example of a separation processing unit according to the present embodiment. In the information processing apparatus 100 according to the present embodiment, the separation processing unit 131 is replaced with a separation processing unit 232 illustrated in FIG. 12.

As illustrated in FIG. 12, the separation processing unit 232 includes a color separation unit 2321, a spectrum extraction unit 2322, and a data set creation unit 2323.

The color separation unit 2321 color-separates a fluorescence spectrum of a stained section (also referred to as a stained sample) input from the fluorescence signal storage unit 122 for each fluorescent substance.

The spectrum extraction unit 2322 is configured to improve the autofluorescence spectrum so that a more accurate color separation result can be obtained, and adjusts the autofluorescence reference spectrum included in the specimen information input from the information storage unit 121 to one that can obtain a more accurate color separation result.

The data set creation unit 2323 creates a data set of an autofluorescence reference spectrum from the spectrum extraction result input from the spectrum extraction unit 2322.

More specifically, the spectrum extraction unit 2322 performs spectrum extraction processing using non-negative matrix factorization (NMF), singular value decomposition (SVD), or the like on the autofluorescence reference spectrum input from the information storage unit 121, and inputs the result to the data set creation unit 2323. Note that, in the spectrum extraction processing according to the present embodiment, for example, an autofluorescence reference spectrum for each cell tissue and/or for each type using a tissue micro array (TMA) is extracted.

Here, as a method for extracting an autofluorescence spectrum from an unstained section, principal component analysis (hereinafter, referred to as "PCA") can be generally used, but PCA is not necessarily suitable when a coupled autofluorescence spectrum is used for processing as in the present embodiment. Therefore, the spectrum extraction unit 1322 according to the present embodiment extracts the autofluorescence reference spectrum from the unstained section by performing non-negative matrix factorization (NMF) instead of PCA.

Figure 13:
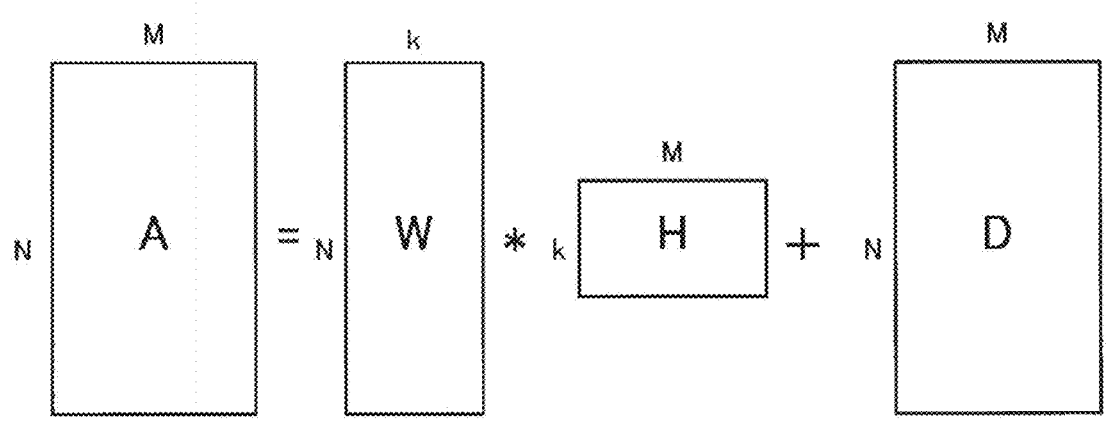
FIG. 13 is a diagram illustrating an overview of non-negative matrix factorization.

FIG. 13 is a diagram illustrating an overview of the NMF. As illustrated in FIG. 13, the NMF decomposes a matrix A of non-negative N rows and M columns (N×M) into a matrix W of non-negative N rows and k columns (N×k) and a matrix H of non-negative k rows and M columns (k×M). The matrix W and the matrix H are determined such that the mean square residual D between the matrix A and the product (W*H) of the matrix W and the matrix H is minimized. In the present embodiment, the matrix A corresponds to the spectrum before the autofluorescence reference spectrum is extracted (N is the number of pixels, and M is the number of wavelength channels), and the matrix H corresponds to the extracted autofluorescence reference spectrum (k is the number of autofluorescence reference spectra (in other words, the number of autofluorescent substances) and M is the number of wavelength channels). Here, the mean square residual D is expressed by the following formula (10). Note that the "norm (D, 'fro')" refers to the Frobenius norm of the mean square residual D.

$$D = \frac{norm(D, \text{'fro'})}{\sqrt{N*M}} \quad (10)$$

For factorization in NMF, an iterative method starting with random initial values for the matrix W and the matrix H is used. In the NMF, the value of k (the number of autofluorescence reference spectra) is essential, but the initial values of the matrix W and the matrix H are not essential and can be set as options, and when the initial values of the matrix W and the matrix H are set, the solution is constant. On the other hand, in a case where the initial values of the matrix W and the matrix H are not set, these initial values are randomly set, and the solution is not constant.

The specimen 20 has different properties depending on the type of tissue used, the type of the target disease, the attribute of the subject, the lifestyle of the subject, or the like, and has different autofluorescence spectra. Therefore, the information processing apparatus 100 according to the second embodiment can implement the fluorescence separation processing with higher accuracy by actually measuring the autofluorescence reference spectrum for each specimen 20 as described above.

Note that the matrix A, which is an input of the NMF, is a matrix including the same number of rows as the number of pixels N (=Hpix×Vpix) of the specimen image and the same number of columns as the number of wavelength channels M, as described above. Therefore, in a case where the number of pixels of the specimen image is large or in a case where the number of wavelength channels M is large, the matrix A becomes a very large matrix, the calculation cost of the NMF increases, and the processing time increases.

Figure 14:
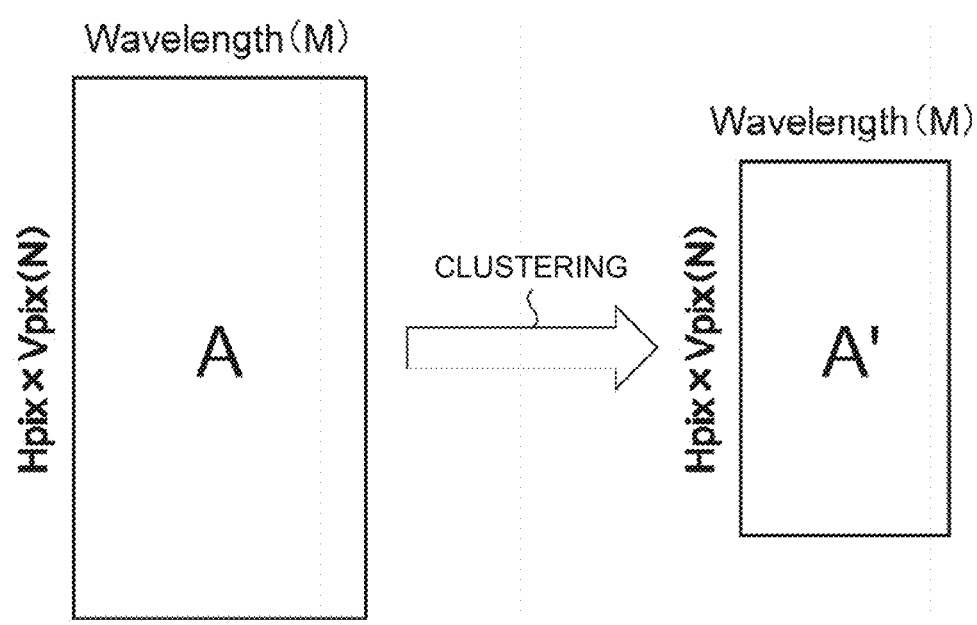
FIG. 14 is a diagram illustrating an overview of clustering.

In such a case, for example, as illustrated in FIG. 14, clustering is performed with the number of classes N (<Hpix×Vpix) in which the number of pixels N (=Hpix×Vpix) of the specimen image is designated, so that it is possible to suppress redundancy of processing time due to enlargement of the matrix A.

In clustering, for example, spectra similar in a wavelength direction and an intensity direction in the specimen image are classified into the same class. As a result, since an image having a smaller number of pixels than the specimen image is generated, it is possible to reduce the scale of the matrix A' using this image as an input.

The data set creation unit 2323 creates a data set (hereinafter, also referred to as autofluorescence data set) necessary for the color separation processing by the color separation unit 2321 from the autofluorescence reference spectrum for each cell tissue and/or for each type input from the spectrum extraction unit 2322, and inputs the created autofluorescence data set to the color separation unit 2321.

The color separation unit 2321 performs color separation processing on the fluorescence spectrum of the stained sample input from the fluorescence signal storage unit 122 using the fluorescence reference spectrum and the autofluorescence reference spectrum input from the information storage unit 121 and the autofluorescence data set input from the data set creation unit 2323, thereby separating the fluorescence spectrum into spectra for each molecule. Note that NMF or SVD can be used for the color separation processing.

As the NMF performed by the color separation unit 2321 according to the present embodiment, for example, an NMF (see FIG. 13 and the like) at the time of extracting an autofluorescence spectrum from an unstained section described in the first embodiment that is changed as follows can be used.

That is, in the present embodiment, the matrix A corresponds to a plurality of specimen images (N is the number of pixels, and M is the number of wavelength channels) acquired from the stained section, the matrix H corresponds to a fluorescence spectrum (k is the number of fluorescence spectra (in other words, the number of fluorescent substances), and M is the number of wavelength channels) for each extracted fluorescent substance, and the matrix W corresponds to an image of each fluorescent substance after fluorescence separation. Note that the matrix D is a mean square residual.

In addition, in the present embodiment, the initial value of NMF may be, for example, random. However, in a case where the result differs for each number of times of application of the NMF, it is necessary to set an initial value in order to prevent the difference.

Note that, in a case where the fluorescence separation processing is performed using an algorithm such as NMF in which the order of the corresponding spectra is changed depending on the calculation algorithm or an algorithm in which the order of the spectra needs to be changed in order to speed up the processing and improve the convergence of the results, which fluorescent dye each of the fluorescence spectra obtained as the matrix H corresponds to can be specified by, for example, obtaining Pearson's product-moment correlation coefficient (or cosine similarity) for each of all combinations.

In addition, in a case where the default function (NMF) of MATLAB (registered trademark) is used, even if an initial value is given, the output is changed in order. This can be fixed by a self-function, but even if the order is changed by using the default function, the correct combination of the substance and the fluorescence spectrum can be obtained by using the Pearson's product-moment correlation coefficient (or cosine similarity) as described above.

As described above, by solving the NMF with the specimen image acquired from the stained section as the matrix A, it is possible to directly extract the fluorescence spectrum for each fluorescent substance from the stained section without requiring a procedure such as photographing of an unstained section or generation of an autofluorescence reference spectrum. This makes it possible to significantly reduce the time required for the fluorescence separation processing and the operation cost.

Furthermore, in the present embodiment, since the fluorescence spectrum for each fluorescent substance is extracted from the specimen image obtained from the same stained section, it is possible to acquire a more accurate fluorescence separation result as compared with, for example, a case of using an autofluorescence spectrum obtained from an unstained section different from the stained section.

Other configurations, operations, and effects may be similar to those of the above-described embodiment, and thus detailed description thereof is omitted here.

Note that, in the present embodiment, when extracting the fluorescence spectrum for each fluorescent substance, a coupled fluorescence spectrum in which the fluorescence spectra for the fluorescent substances are coupled may be used. In the case of using the coupled fluorescence spectrum, the extraction unit of the separation processing unit 131 performs processing of coupling the plurality of fluorescence spectra acquired by the fluorescence signal acquisition unit 112 and extracting the fluorescence spectrum for each fluorescent substance with respect to the coupled fluorescence spectrum generated by the coupling.

6. Fifth Embodiment

In the fourth embodiment described above, examples of a method for enhancing the quantitativity of the concentration or the like for the staining dye include the following methods.

Figure 15:
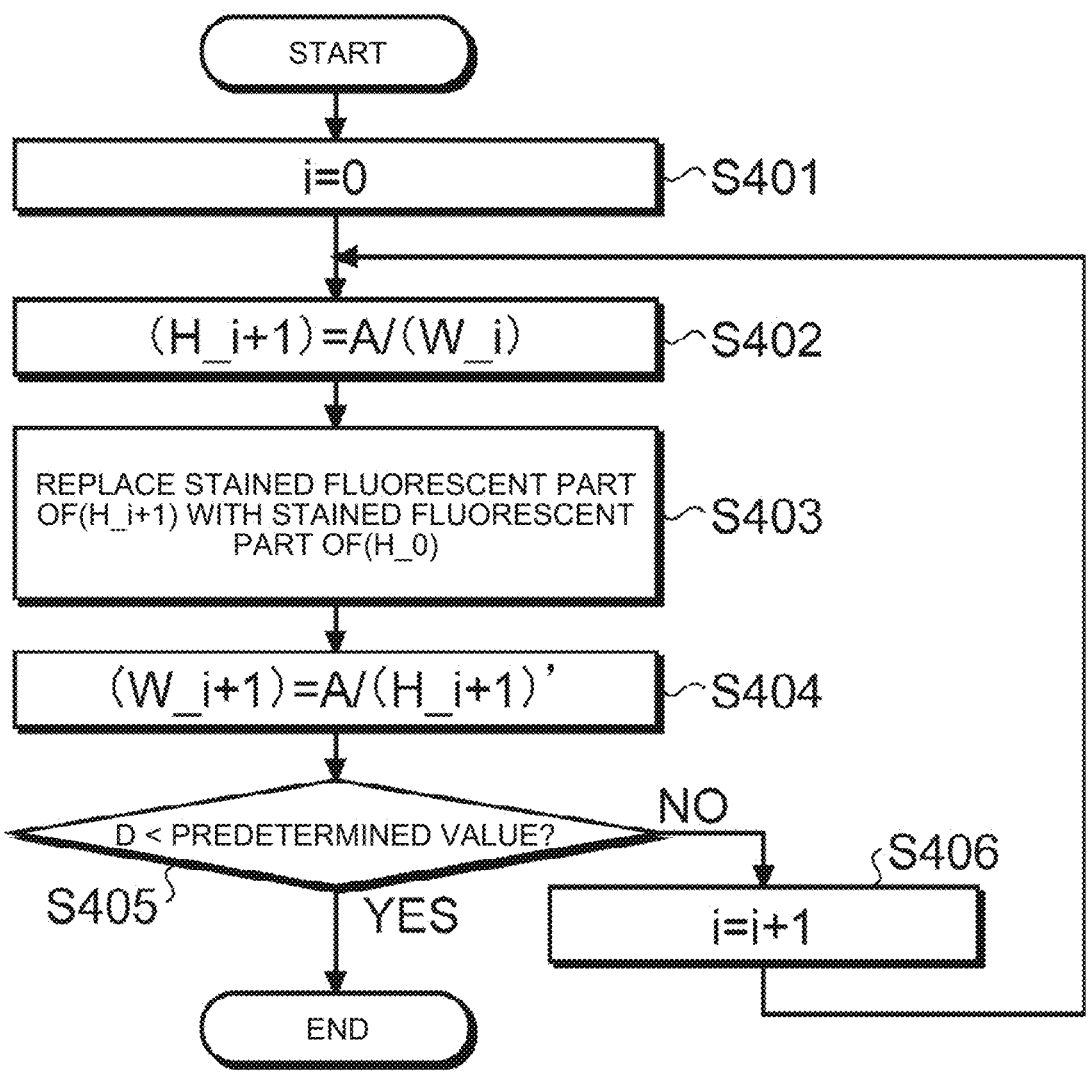
FIG. 15 is a flowchart for explaining a flow of NMF according to a fifth embodiment.
Figure 16:
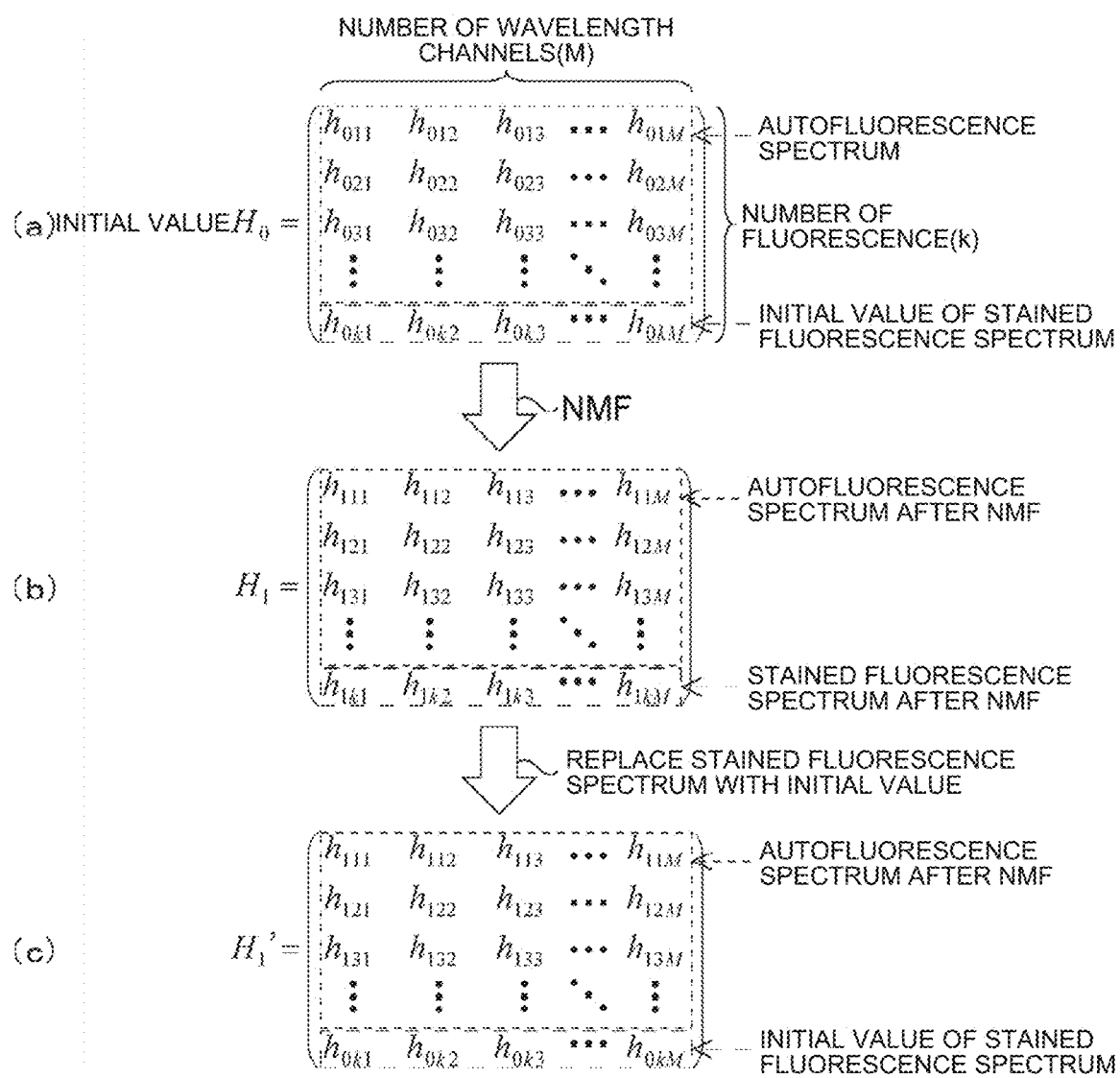
FIGS. 16A, 16B, and 16C are diagrams for explaining a flow of processing in a first loop of the NMF illustrated in FIG. 15.

FIG. 15 is a flowchart for explaining a flow of NMF according to a fifth embodiment. FIGS. 16A, 16B, and 16C are diagrams for explaining a flow of processing in a first loop of the NMF illustrated in FIG. 15.

As illustrated in FIG. 15, in the NMF according to the present embodiment, first, the variable i is reset to 0 (step S401). The variable i indicates the number of times of repeated factorization in NMF. Therefore, the matrix H0 illustrated in FIG. 16A corresponds to the initial value of the matrix H. Note that, in this example, the position of the stained fluorescence spectrum in the matrix H is set to the lowermost row for the sake of clarity, but the present invention is not limited thereto, and various changes such as the uppermost row and the intermediate row can be made.

Next, in the NMF according to the present embodiment, similarly to the normal NMF, the matrix A of non-negative N rows and M columns (N×M) is divided by the matrix Wi of non-negative N rows and k columns (N×k) to obtain the matrix Hi+1 of non-negative k rows and M columns (k×M) (step S402). As a result, for example, in the first loop, a matrix H1 as illustrated in (b) of FIG. 16B is obtained.

Next, the row of the fluorescent stained spectrum in the matrix Hi+1 obtained in step S402 is replaced with the initial value of the fluorescent stained spectrum, that is, the row of the stained fluorescence spectrum in the matrix H0 (step S403). That is, in the present embodiment, the fluorescent stained spectrum in the matrix H is fixed to the initial value. For example, in the first loop, as illustrated in FIG. 16C, it is possible to fix the stained fluorescence spectrum by replacing the lowermost row in the matrix H1 with the lowermost row in the matrix H0.

Next, in the NMF according to the present embodiment, the matrix $W_{i+1}$ is obtained by dividing the matrix A by the matrix $H_{i+1}$ obtained in step S403 (step S404).

Thereafter, in the NMF according to the present embodiment, similarly to the normal NMF, it is determined whether or not the mean square residual D satisfies a predetermined branching condition (step S405). In a case where the mean square residual D satisfies the predetermined branching condition (YES in step S405), the NMF is terminated using the finally obtained matrices $H_{i+1}$ and $W_{i+1}$ as solutions. On the other hand, when the predetermined branching condition is not satisfied (NO in step S405), the variable i is incremented by 1 (step S406), the process returns to step S402, and the next loop is performed.

As described above, in the first method, in the spectral extraction and the color separation of the pathological section image (specimen image) of multiple staining, it is possible to directly color-separate the stained sample using the NMF while securing the quantitativity of the stained fluorescence, that is, while maintaining the spectrum of the stained fluorescence without requiring the photographing of the same tissue section unstained sample for autofluorescence spectral extraction. As a result, for example, it is possible to achieve accurate color separation as compared with the case of using another specimen. In addition, it is also possible to reduce time and effort for photographing another specimen.

Note that, as a method of minimizing the mean square residual D, a method using a recurrence relation that minimizes $D=|A-WH|^2$, a method using a quasi-Newton method (also referred to as a DFP (Davidon-Fletcher-Powell) method), a BFGS (Broyden-Fletcher-Goldfarb-Shanno) method, or the like can be considered. In these cases, as a method for fixing the stained fluorescence spectrum to the initial value, the following method is considered.

6.1. Method for Fixing Stained Fluorescence Spectrum in Minimization of Mean Square Residual D Using Recurrence Relation In the method of minimizing the mean square residual D using the recurrence relation that minimizes $D=|A-WH|^2$, loop processing of repeating steps including multiplication type update formulas as expressed in the following formulas (11) and (12) is performed. Note that, in formulas (11) and (12), $A=(a_{i,j})_{N \times M}$, $H=(h_{i,j})_{k \times M}$, and $W=(w_{i,j})_{N \times k}$. In addition, $^t h$ and $^t w$ are transposed matrices of the submatrices h and w, respectively.

$$w_{i,j}^{k+1} \leftarrow w_{i,j}^k \frac{(a^t h^k)_{i,j}}{(w^k h^{ki} h^k)_{i,j}} \quad (11)$$

$$h_{i,j}^{k+1} \leftarrow h_{i,j}^k \frac{(^t w^k a)_{i,j}}{(^t w^k w^k h^k)_{i,j}} \quad (12)$$

In such loop processing, in order to fix the stained fluorescence spectrum to the initial value, a method of inserting a step of executing the following formula (13) between the step of executing formula (11) and the step of executing formula (12) can be used. Note that formula (13) indicates that the submatrix corresponding to the updated stained fluorescence spectrum in $w_{i,j}^{k+1}$ is overwritten with the submatrix $w_{i,j(part)}^k$ that is the initial value of the stained fluorescence spectrum.

$$w_{i,j}^{k+1} \leftarrow w_{i,j(part)}^k \quad (13)$$

6.2. Method for Fixing Stained Fluorescence Spectrum in Minimization of Mean Square Residual D Using DFP Method, BFGS Method, or the Like In addition, in the method of minimizing the mean square residual D using the DFP method, the BFGS method, or the like, when the mean square residual D of the minimization target is D(x) and x is a coordinate $(x_k=(a1, a2, \ldots, an)_k$ at the time of k-th update), D(x) is minimized through the following steps. In the following steps, B denotes a Hessian matrix.

Update coordinates with $x_{k+1}=x_k - \alpha B_k^{-1} D'(x_k)$
Displacement to gradient at new coordinate $x_{k+1}$
Update inverse matrix of Hessian $B_{k+1}^{-1}$ from $y_k = D'(x_{k+1}) - D'(x_k)$ For updating the Hessian matrix Bk+1, for example, various methods such as a DFP method represented by the following formula (14) and a BFGF method represented by formula (15) can be applied.

$$B_{k+1} = \left(I - \frac{y_k \Delta x_k^T}{y_k^T \Delta x_k}\right) B_k \left(I - \frac{\Delta x_k y_k^T}{y_k^T \Delta x_k}\right) + \frac{y_k y_k^T}{y_k^T \Delta x_k} \quad (14)$$

$$B_{k+1} = B_k + \frac{y_k y_k^T}{y_k^T \Delta x_k} - \frac{B_k \Delta x_k (B_k \Delta x_k)^T}{\Delta x_k^T B_k \Delta x_k} \quad (15)$$

In such a method of minimizing the mean square residual D using the DFP method, the BFGS method, or the like, there are several methods as a method of fixing arbitrary coordinates, that is, a method of fixing the stained fluorescence spectrum to an initial value. For example, it is possible to fix the stained fluorescence spectrum to the initial value by a method of performing the following processing (1) or processing (2) at the timing of updating the coordinates.

(1) Replace partial derivative $D'(x_k)$ to 0, i.e. $\alpha B_k^{-1} D'(x_k) = 0$ (2) Calculate $x_{k+1}$ after coordinate update, and forcibly replace part of obtained coordinate $x_{k+1}$ with $x_k$ (or part thereof)

7. Hardware Configuration Example

Figure 17:
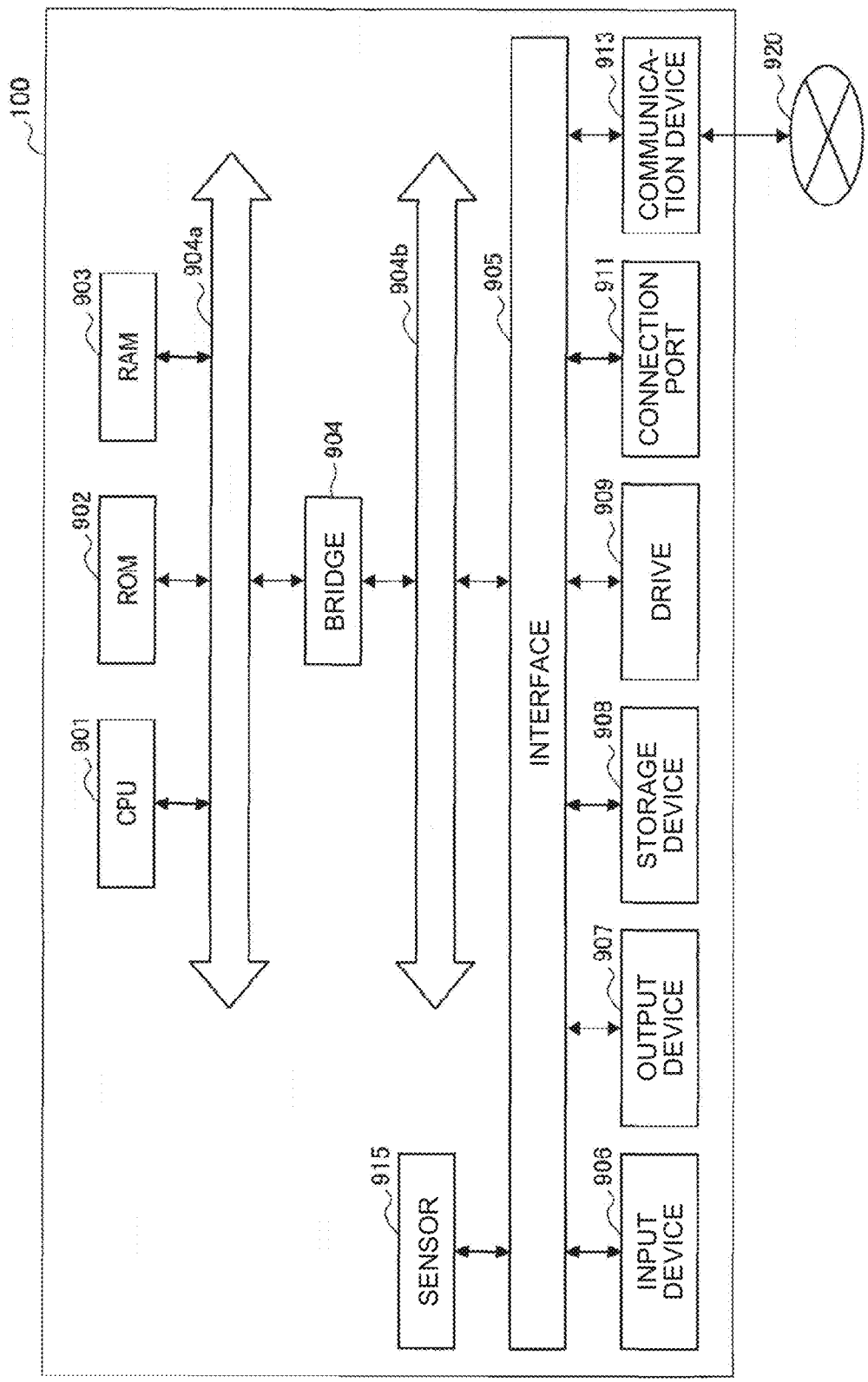
FIG. 17 is a block diagram illustrating a hardware configuration example of an information processing apparatus according to each embodiment.

Next, a hardware configuration example of the information processing apparatus 100 according to each embodiment and modification will be described with reference to FIG. 17. FIG. 17 is a block diagram illustrating a hardware configuration example of the information processing apparatus 100. Various types of processing by the information processing apparatus 100 are implemented by cooperation of software and hardware described below.

As illustrated in FIG. 17, the information processing apparatus 100 includes a central processing unit (CPU) 901, a read only memory (ROM) 902, a random access memory (RAM) 903, and a host bus 904a. In addition, the information processing apparatus 100 includes a bridge 904, an external bus 904b, an interface 905, an input device 906, an output device 907, a storage device 908, a drive 909, a connection port 911, a communication device 913, and a sensor 915. The information processing apparatus 100 may include a processing circuit such as a DSP or an ASIC instead of or in addition to the CPU 901.

The CPU 901 functions as an arithmetic processing device and a control device, and controls the overall operation in the information processing apparatus 100 according to various programs. In addition, the CPU 901 may be a microprocessor. The ROM 902 stores programs, operation parameters, and the like used by the CPU 901. The RAM 903 temporarily stores programs used in the execution of the CPU 901, parameters that appropriately change in the execution, and the like. The CPU 901 can embody, for example, at least the processing unit 130 and the control unit 150 of the information processing apparatus 100.

The CPU 901, the ROM 902, and the RAM 903 are mutually connected by a host bus 904a including a CPU bus and the like. The host bus 904a is connected to the external bus 904b such as a peripheral component interconnect (PCI)/interface bus via the bridge 904. Note that the host bus 904a, the bridge 904, and the external bus 904b do not necessarily need to be configured separately, and these functions may be mounted on one bus.

The input device 906 is implemented by, for example, a device to which information is input by an implementer, such as a mouse, a keyboard, a touch panel, a button, a microphone, a switch, and a lever. In addition, the input device 906 may be, for example, a remote control device using infrared rays or other radio waves, or may be an external connection device such as a mobile phone or a PDA corresponding to the operation of the information processing apparatus 100. Furthermore, the input device 906 may include, for example, an input control circuit that generates an input signal on the basis of information input by the implementer using the above input means and outputs the input signal to the CPU 901. By operating the input device 906, the implementer can input various data to the information processing apparatus 100 and instruct the information processing apparatus 100 to perform a processing operation. The input device 906 can embody at least the operation unit 160 of the information processing apparatus 100, for example.

The output device 907 is formed of a device capable of visually or audibly notifying the implementer of the acquired information. Examples of such a device include a display device such as a CRT display device, a liquid crystal display device, a plasma display device, an EL display device, and a lamp, a sound output device such as a speaker and a headphone, and a printer device. The output device 907 can embody at least the display unit 140 of the information processing apparatus 100, for example.

The storage device 908 is a device for storing data. The storage device 908 is implemented by, for example, a magnetic storage device such as an HDD, a semiconductor storage device, an optical storage device, a magneto-optical storage device, or the like. The storage device 908 may include a storage medium, a recording device that records data in the storage medium, a reading device that reads data from the storage medium, a deletion device that deletes data recorded in the storage medium, and the like. The storage device 908 stores programs performed by the CPU 901, various data, various data acquired from the outside, and the like. The storage device 908 can embody at least the storage unit 120 of the information processing apparatus 100, for example.

The drive 909 is a reader/writer for a storage medium, and is built in or externally attached to the information processing apparatus 100. The drive 909 reads information recorded in a removable storage medium such as a mounted magnetic disk, optical disk, magneto-optical disk, or semiconductor memory, and outputs the information to the RAM 903. In addition, the drive 909 can also write information to a removable storage medium.

The connection port 911 is an interface connected to an external device, and is a connection port to an external device capable of transmitting data by, for example, a universal serial bus (USB).

The communication device 913 is, for example, a communication interface formed by a communication device or the like for connecting to the network 920. The communication device 913 is, for example, a communication card for wired or wireless local area network (LAN), long term evolution (LTE), Bluetooth (registered trademark), wireless USB (WUSB), or the like. In addition, the communication device 913 may be a router for optical communication, a router for asymmetric digital subscriber line (ADSL), a modem for various communications, or the like. For example, the communication device 913 can transmit and receive signals and the like to and from the Internet and other communication devices according to a predetermined protocol such as TCP/IP.

In the present embodiment, the sensor 915 includes a sensor capable of acquiring a spectrum (for example, an imaging element or the like), but may include another sensor (for example, an acceleration sensor, a gyro sensor, a geomagnetic sensor, a pressure-sensitive sensor, a sound sensor, a distance measuring sensor, or the like). The sensor 915 can embody at least the fluorescence signal acquisition unit 112 of the information processing apparatus 100, for example.

Note that the network 920 is a wired or wireless transmission path of information transmitted from a device connected to the network 920. For example, the network 920 may include a public network such as the Internet, a telephone network, or a satellite communication network, various local area networks (LANs) including Ethernet (registered trademark), a wide area network (WAN), or the like. In addition, the network 920 may include a dedicated line network such as an Internet protocol-virtual private network (IP-VPN).

The hardware configuration example capable of implementing the functions of the information processing apparatus 100 has been described above. Each of the above-described components may be implemented using a general-purpose member, or may be implemented by hardware specialized for the function of each component. Therefore, it is possible to appropriately change the hardware configuration to be used according to the technical level at the time of implementing the present disclosure.

Note that a computer program for implementing each function of the information processing apparatus 100 as described above can be created and mounted on a PC or the like. In addition, a computer-readable recording medium storing such a computer program can also be provided. The recording medium includes, for example, a magnetic disk, an optical disk, a magneto-optical disk, a flash memory, and the like. In addition, the computer program described above may be distributed via, for example, a network without using a recording medium.

8. Remarks

In the above description, in general, since the actual specimen information and reagent information are often different from the catalog value and the document value, it has been described that it is more preferable that the specimen information and the reagent information be independently measured and managed in the information processing system according to the present disclosure. Therefore, as a remark, the fact that the actual specimen information and reagent information are different from the catalog value and the document value will be described with reference to FIGS. 18 and 19.

Figure 18:
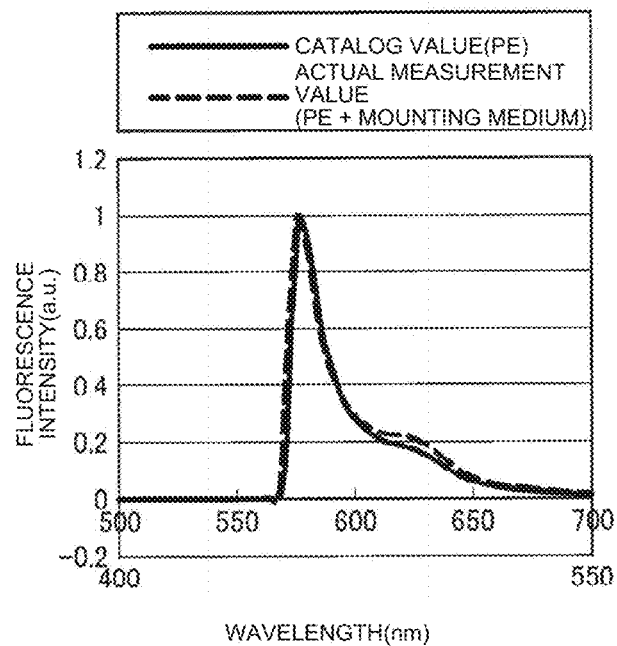
FIG. 18 is a diagram for explaining that actual specimen information and reagent information are different from a catalog value and a document value.
Figure 19:
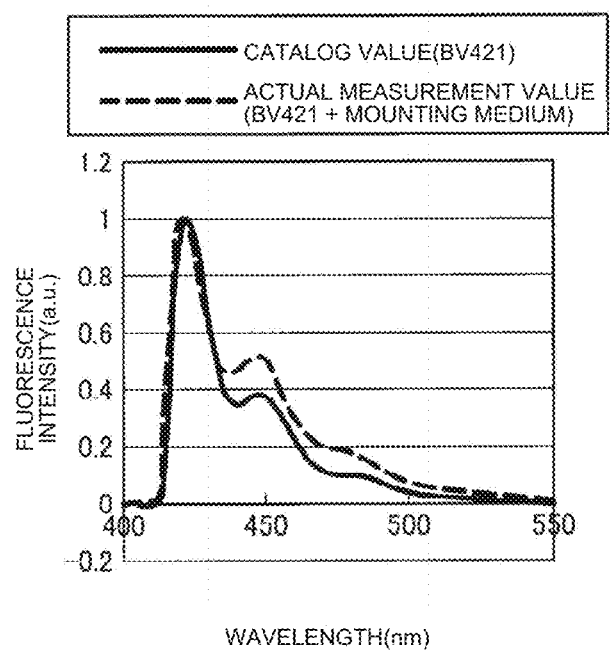
FIG. 19 is a diagram for explaining that actual specimen information and reagent information are different from a catalog value and a document value.

FIG. 18 is a diagram illustrating a comparison result between an actual measurement value of spectrum information of PE (Phycoerythrin) which is a kind of fluorescent component and a catalog value. In addition, FIG. 19 is a diagram illustrating a comparison result between an actual measurement value of spectrum information of BV421 (Brilliant Violet 421) which is a kind of fluorescent component and a catalog value. Note that, as the actual measurement value, a measurement result using a sample prepared with these fluorescent components and a mounting medium is illustrated.

As illustrated in FIGS. 18 and 19, the position of the peak in the spectrum information substantially coincides with the actual measurement value and the catalog value, but the shapes of the spectra on the longer wavelength side than the peak wavelength are different from each other. Therefore, the separation accuracy between the fluorescence signal and the autofluorescence signal is lowered by using the catalog value as the spectrum information.

Note that not only the spectrum information but also various types of information included in the specimen information and the reagent information are generally preferably independently measured in the information processing system according to the present disclosure from the viewpoint of accuracy.

9. Modification of System Configuration

Figure 20:
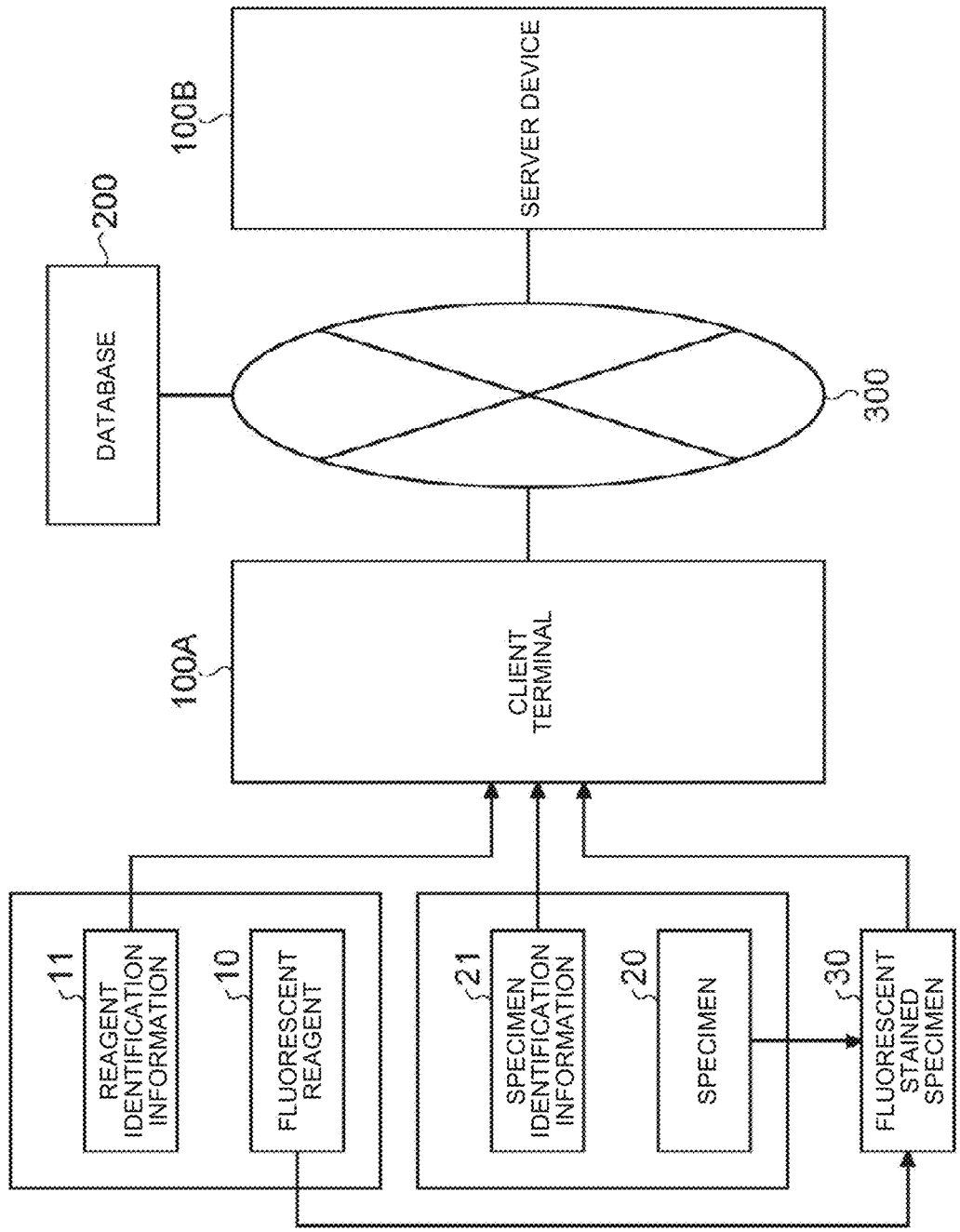
FIG. 20 is a block diagram illustrating a configuration example of an information processing system according to a modification of each embodiment.

Note that the information processing system (see FIG. 1) according to the above-described embodiment can have a server-client system configuration. FIG. 20 is a block diagram illustrating a schematic configuration example of an information processing system configured as a server-client type.

As illustrated in FIG. 20, the information processing system according to the present modification includes a client terminal 100A, a server device 100B, and a database 200, which are communicably connected to each other via a predetermined network 300. Various networks such as a wide area network (WAN) (including the Internet), a local area network (LAN), a public line network, and a mobile communication network can be applied to the network 300.

The client terminal 100A is a terminal device used by a doctor, a researcher, or the like, and includes, for example, at least the acquisition unit 110, the display unit 140, the control unit 150, and the operation unit 160 in the configuration illustrated in FIG. 1.

Meanwhile, the server device 100B is not limited to a single server, and may be configured by a plurality of servers or may be a cloud server. The server device 100B can include, for example, at least one of the information storage unit 121, the fluorescence signal storage unit 122, the fluorescence separation result storage unit 123, the separation processing unit 131, the image generation unit 132, and the model generation unit 133 in the configuration illustrated in FIG. 1. Among these configurations, a configuration not included in the server device 100B may be provided in the client terminal 100A.

The number of client terminals 100A connected to the same server device 100B is not limited to one, and may be plural. In this case, the plurality of client terminals 100A may be introduced into different hospitals.

With such a system configuration, not only a system with higher calculation capability can be provided to a user such as a doctor or a researcher, but also more information can be accumulated in the database 200. This suggests that extension to a system that performs machine learning or the like on the big data accumulated in the database 200 is facilitated.

However, the configuration is not limited to the above-described configuration, and various modifications can be made, for example, a configuration in which only the database 200 is shared by the plurality of information processing apparatuses 100 via the network 300.

10. Application Example 1

In addition, in the above-described embodiment, the case where the technique according to the present disclosure is applied to so-called multiple flow cytometry imaging (MFI) in which two-dimensional fluorescence images of the fluorescent stained specimen 30 that is a tissue section subjected to multiple staining are acquired has been described. However, the present disclosure is not limited thereto, and the technique according to the present disclosure can also be applied to a so-called imaging cytometer or the like in which two-dimensional fluorescence images of microparticles such as cells subjected to multiple staining are acquired.

11. Application Example 2

In addition, the technique according to the present disclosure can be applied to various products. For example, the technique according to the present disclosure may be applied to a pathological diagnosis system in which a doctor or the like diagnoses a lesion by observing cells or tissues collected from a patient, a support system thereof, or the like (hereinafter, referred to as a diagnosis support system). The diagnosis support system may be a whole slide imaging (WSI) system that diagnoses or supports a lesion on the basis of an image acquired using a digital pathology technique.

Figure 21:
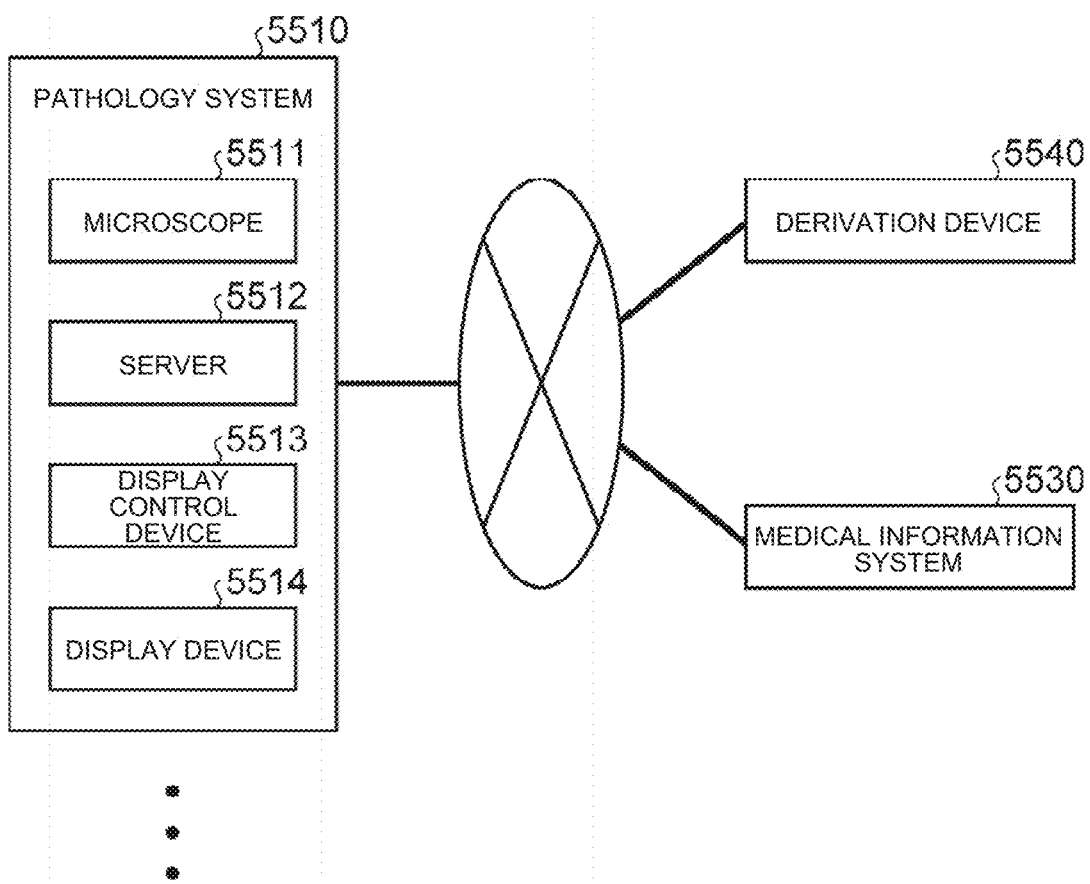
FIG. 21 is a block diagram illustrating an example of a schematic configuration of a diagnosis support system.

FIG. 21 is a diagram illustrating an example of a schematic configuration of a diagnosis support system 5500 to which the technique according to the present disclosure is applied. As illustrated in FIG. 21, the diagnosis support system 5500 includes one or more pathology systems 5510. Furthermore, a medical information system 5530 and a derivation device 5540 may be included.

Each of the one or more pathology systems 5510 is a system mainly used by a pathologist, and is introduced into, for example, a laboratory or a hospital. Each pathology system 5510 may be introduced into different hospitals, and is connected to the medical information system 5530 and the derivation device 5540 via various networks such as a wide area network (WAN) (including the Internet), a local area network (LAN), a public line network, and a mobile communication network.

Each pathology system 5510 includes a microscope 5511, a server 5512, a display control device 5513, and a display device 5514.

The microscope 5511 has a function of an optical microscope, captures an image of an observation target placed on a glass slide, and acquires a pathological image which is a digital image. The observation target is, for example, a tissue or a cell collected from a patient, and may be a piece of meat of an organ, saliva, blood, or the like.

The server 5512 stores and saves the pathological image acquired by the microscope 5511 in a storage unit (not illustrated). In addition, when receiving a request for viewing from the display control device 5513, the server 5512 searches for a pathological image from a storage unit (not illustrated) and sends the searched pathological image to the display control device 5513.

The display control device 5513 transmits a request for viewing the pathological image received from the user to the server 5512. Then, the display control device 5513 displays the pathological image received from the server 5512 on the display device 5514 using liquid crystal, electro-luminescence (EL), cathode ray tube (CRT), or the like. Note that the display device 5514 may be compatible with 4K or 8K, and is not limited to one device, and may be a plurality of devices.

Here, when the observation target is a solid material such as a piece of meat of an organ, the observation target may be, for example, a stained thin section. The thin section may be produced, for example, by slicing a block piece cut out from a specimen such as an organ. In addition, at the time of slicing, the block piece may be fixed with paraffin or the like.

For staining a thin section, various types of staining may be applied, such as general staining indicating the morphology of a tissue, such as HE (Hematoxylin-Eosin) staining, or immunostaining indicating the immune state of a tissue, such as IHC (Immunohistochemistry) staining. At that time, one thin section may be stained using a plurality of different reagents, or two or more thin sections (also referred to as adjacent thin sections) continuously cut out from the same block piece may be stained using different reagents.

The microscope 5511 may include a low-resolution imaging unit for low-resolution imaging and a high-resolution imaging unit for high-resolution imaging. The low-resolution imaging unit and the high-resolution imaging unit may be different optical systems or may be the same optical system. In the case of the same optical system, the resolution of the microscope 5511 may be changed according to the imaging target.

The glass slide containing the observation target is placed on a stage positioned within the angle of view of the microscope 5511. The microscope 5511 first acquires an entire image within the angle of view using the low-resolution imaging unit, and specifies a region of the observation target from the acquired entire image. Subsequently, the microscope 5511 divides a region where the observation target exists into a plurality of divided regions of a predetermined size, and sequentially images each of the divided regions by the high-resolution imaging unit to acquire a high-resolution image of each of the divided regions. In switching the target divided region, the stage may be moved, the imaging optical system may be moved, or both of them may be moved. In addition, each divided region may overlap an adjacent divided region in order to prevent occurrence of an imaging leakage region due to unintended sliding of a glass slide. Furthermore, the entire image may include identification information for associating the entire image with the patient. The identification information may be, for example, a character string, a QR code (registered trademark), or the like.

The high-resolution image acquired by the microscope 5511 is input to the server 5512. The server 5512 divides each high-resolution image into partial images (hereinafter, referred to as a tile image) of a smaller size. For example, the server 5512 divides one high-resolution image into a total of 100 tile images of 10×10 in the vertical and horizontal directions. At this time, if the adjacent divided regions overlap, the server 5512 may perform stitching processing on the adjacent high-resolution images using a technique such as template matching. In that case, the server 5512 may divide the entire high-resolution image pasted by the stitching processing to generate the tile image. However, the generation of the tile image from the high-resolution image may be performed before the stitching processing.

In addition, the server 5512 can generate a tile image having a smaller size by further dividing the tile image. The generation of such a tile image may be repeated until a tile image having a size set as a minimum unit is generated.

When the tile image of the minimum unit is generated in this manner, the server 5512 performs the tile synthesis processing of synthesizing a predetermined number of adjacent tile images to generate one tile image on all the tile images. This tile synthesis processing may be repeated until one tile image is finally generated. By such processing, a tile image group having a pyramid structure in which each hierarchy includes one or more tile images is generated. In this pyramid structure, the number of pixels is the same between a tile image of a certain layer and a tile image of a layer different from this layer, but the resolutions thereof are different. For example, in a case where a total of four tile images of 2×2 are synthesized to generate one tile image of the upper layer, the resolution of the tile image of the upper layer is ½ times the resolution of the tile image of the lower layer used for the synthesis.

By constructing the tile image group having such a pyramid structure, it is possible to switch the level of detail of the observation target displayed on the display device depending on the hierarchy to which the tile image to be displayed belongs. For example, in a case where the lowermost layer tile image is used, a narrow region of the observation target can be displayed in detail, and a wider region of the observation target can be displayed coarser as the upper layer tile image is used.

The generated tile image group having the pyramid structure is stored in a storage unit (not illustrated) together with identification information (referred to as tile identification information) that can uniquely identify each tile image, for example. When receiving a tile image acquisition request including tile identification information from another device (for example, the display control device 5513 or the derivation device 5540), the server 5512 transmits a tile image corresponding to the tile identification information to the other device.

Note that the tile image as the pathological image may be generated for each imaging condition such as the focal length and the staining condition. In a case where the tile image is generated for each imaging condition, another pathological image that corresponds to an imaging condition different from the specific imaging condition and is in the same region as the specific pathological image may be displayed side by side together with the specific pathological image. The specific imaging condition may be designated by the viewer. In addition, in a case where a plurality of imaging conditions is designated for the viewer, pathological images of the same region corresponding to each imaging condition may be displayed side by side.

In addition, the server 5512 may store the tile image group having the pyramid structure in a storage device other than the server 5512, for example, a cloud server or the like. Furthermore, a part or whole of the above tile image generation processing may be performed by a cloud server or the like.

The display control device 5513 extracts a desired tile image from the tile image group of the pyramid structure according to the input operation from the user, and outputs the extracted tile image to the display device 5514. By such processing, the user can obtain a feeling as if the user is observing the observation target while changing the observation magnification. That is, the display control device 5513 functions as a virtual microscope. The virtual observation magnification here actually corresponds to the resolution.

Note that any method may be used as a method of capturing a high-resolution image. The divided region may be imaged to acquire a high-resolution image while repeating stop and movement of the stage, or the divided region may be imaged to acquire a high-resolution image on the strip while moving the stage at a predetermined speed. In addition, the processing of generating a tile image from a high-resolution image is not essential, and an image in which the resolution changes in stages may be generated by changing the resolution of the entire high-resolution image pasted by the stitching processing in stages. Even in this case, it is possible to present low-resolution images in a wide area region to high-resolution images in a narrow area to the user in stages.

The medical information system 5530 is a so-called electronic medical record system, and stores information related to diagnosis such as information for identifying a patient, patient disease information, examination information and image information used for diagnosis, a diagnosis result, and prescription medicine. For example, a pathological image obtained by imaging an observation target of a certain patient can be temporarily stored via the server 5512 and then displayed on the display device 5514 by the display control device 5513. The pathologist using the pathology system 5510 performs pathological diagnosis on the basis of the pathological image displayed on the display device 5514. The pathological diagnosis result performed by the pathologist is stored in the medical information system 5530.

The derivation device 5540 can perform analysis including fluorescence separation processing on the pathological image. For this analysis, a learning model created by machine learning can be used. The derivation device 5540 may derive a classification result of the specific region, an identification result of the tissue, and the like as the analysis result. Furthermore, the derivation device 5540 may derive identification results such as cell information, number, position, and luminance information, scoring information for the identification results, and the like. These pieces of information derived by the derivation device 5540 may be displayed on the display device 5514 of the pathology system 5510 as diagnosis support information.

Note that the derivation device 5540 may be a server system including one or more servers (including a cloud server) or the like. In addition, the derivation device 5540 may be configured to be incorporated in, for example, the display control device 5513 or the server 5512 in the pathology system 5510. That is, various analyses on the pathological image may be performed in the pathology system 5510.

The technique according to the present disclosure can be suitably applied to the entire diagnosis support system 5500 among the configurations described above. Specifically, the acquisition unit 110 may correspond to the microscope 5511, the display control device 5513 may correspond to the control unit 150, the display device 5514 may correspond to the display unit 140, the remaining configuration of the pathology system 5510 and the derivation device 5540 may correspond to the remaining configuration of the information processing apparatus 100, and the medical information system 5530 may correspond to the database 200. As described above, by applying the technique according to the present disclosure to the diagnosis support system 5500, it is possible to achieve effects such as enabling a doctor or a researcher to more accurately diagnose or analyze a lesion.

Note that the configuration described above can be applied not only to the diagnosis support system but also to all biological microscopes such as a confocal microscope, a fluorescence microscope, and a video microscope. Here, the observation target may be a biological sample such as a cultured cell, a fertilized egg, or a sperm, a biological material such as a cell sheet or a three-dimensional cell tissue, or a biological body such as a zebrafish or a mouse. In addition, the observation target is not limited to a glass slide, and can be observed in a state of being stored in a well plate, a petri dish, or the like.

Furthermore, a moving image may be generated from still images of the observation target acquired using a microscope. For example, a moving image may be generated from still images continuously captured for a predetermined period, or an image sequence may be generated from still images captured at predetermined intervals. In this manner, by generating a moving image from still images, it is possible to analyze dynamic characteristics of an observation target, such as movement such as pulsation, elongation, and migration of cancer cells, nerve cells, myocardial tissue, sperm, and the like, and a division process of cultured cells and fertilized eggs, using machine learning.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

In addition, the effects described in the present specification are merely illustrative or exemplary, and are not restrictive. That is, the technique according to the present disclosure can exhibit other effects obvious to those skilled in the art from the description of the present specification together with or instead of the above effects.

Note that the following configurations also belong to the technical scope of the present disclosure.

(1)

An information processing apparatus comprising: a separation unit that separates a fluorescence signal derived from a fluorescent reagent from a fluorescence image on the basis of the fluorescence image of a biological sample containing a cell, a reference spectrum derived from the biological sample or the fluorescent reagent, and morphological information of the cell.

(2)

The information processing apparatus according to (1), wherein the separation unit further separates a fluorescence signal derived from the biological sample from the fluorescence image.

(3)

The information processing apparatus according to (1), wherein the morphological information includes distribution information of a target in the biological sample.

(4)

The information processing apparatus according to (3), wherein the target is an antigen in the biological sample, and the distribution information includes a distribution of expression levels of the antigen.

(5)

The information processing apparatus according to (4), wherein the morphological information includes a binary mask image indicating the distribution of the expression levels of the antigen.

(6)

The information processing apparatus according to any one of (1) to (5), wherein the fluorescent reagent includes an antibody labeled with a fluorescent dye.

(7)

The information processing apparatus according to any one of (1) to (6), further comprising an image generation unit that generates a fluorescence image corrected on the basis of the fluorescence signal separated.

(8)

The information processing apparatus according to any one of (1) to (7), further comprising an extraction unit that optimizes the reference spectrum derived from the biological sample or the fluorescent reagent.

(9)

The information processing apparatus according to (8), wherein the separation unit separates the fluorescence signal of the fluorescence image by a least squares method, a weighted least squares method, or a constrained least squares method using the reference spectrum and the morphological information.

(10)

The information processing apparatus according to (8), wherein the separation unit separates the fluorescence signal of the fluorescence image by inputting the fluorescence image, the reference spectrum, and the morphological information to a first image generation model.

(11)

The information processing apparatus according to (10), wherein the first image generation model is a learned model obtained by learning color separation information obtained by separating the fluorescence signal of the fluorescence image as teacher data.

(12)

The information processing apparatus according to any one of (8) to (11), wherein the separation unit further separates the fluorescence signal of the fluorescence image on the basis of a bright field image and an unstained image of the biological sample.

(13)

The information processing apparatus according to (12), wherein the separation unit separates the fluorescence signal of the fluorescence image by inputting the fluorescence image, the bright field image, the unstained image, and staining information to a second inference model.

(14)

The information processing apparatus according to (13), wherein
the fluorescent reagent contains an antibody labeled with a fluorescent dye, and
the staining information includes information on a combination of the antibody and the fluorescent dye in the fluorescent reagent.

(15)

The information processing apparatus according to (13) or (14), wherein the second inference model is a learned model obtained by learning the morphological information generated as a binary mask image as teacher data.

(16)

The information processing apparatus according to (15), wherein the morphological information learned as the teacher data includes region information of the biological sample.

(17)

The information processing apparatus according to (16), wherein
the morphological information learned as the teacher data includes region information of the biological sample obtained by segmentation, and
the region information of the biological sample includes region information on at least one or more of a tissue, a cell, and a nucleus.

(18)

The information processing apparatus according to (17), wherein the region information of the biological sample further includes the staining information.

(19)

The information processing apparatus according to (18), wherein
the second inference model further includes a third inference model, and
the third inference model is a learned model in which the staining information specified by classification is learned as teacher data for the region information of each tissue or cell.

(20)

An information processing system comprising:
an information processing apparatus that acquires a fluorescence image of a biological sample containing a cell and a reference spectrum derived from the biological sample or a fluorescent reagent; and
a program for causing the information processing apparatus to perform processing of separating a fluorescence signal derived from the fluorescent reagent from the fluorescence image on the basis of the fluorescence image, the reference spectrum, and morphological information of the cell.

REFERENCE SIGNS LIST

10 FLUORESCENT REAGENT
11 REAGENT IDENTIFICATION INFORMATION
20 SPECIMEN
21 SPECIMEN IDENTIFICATION INFORMATION
30 FLUORESCENT STAINED SPECIMEN
100 INFORMATION PROCESSING APPARATUS
110 ACQUISITION UNIT
111 INFORMATION ACQUISITION UNIT
112 FLUORESCENCE SIGNAL ACQUISITION UNIT
120 STORAGE UNIT
121 INFORMATION STORAGE UNIT
122 FLUORESCENCE SIGNAL STORAGE UNIT
123 FLUORESCENCE SEPARATION RESULT STORAGE UNIT
130 PROCESSING UNIT
131, 231 SEPARATION PROCESSING UNIT
132 IMAGE GENERATION UNIT
133, 233 MODEL GENERATION UNIT
134, 234, 234A INFERENCE MODEL
140 DISPLAY UNIT
150 CONTROL UNIT
160 OPERATION UNIT
200 DATABASE
2311 FLUORESCENCE SEPARATION UNIT
2311a FIRST FLUORESCENCE SEPARATION UNIT
2311b SECOND FLUORESCENCE SEPARATION UNIT
2312 SPECTRUM EXTRACTION UNIT

The invention claimed is:

1. An information processing apparatus, comprising:
a separation unit configured to separate a fluorescence signal of a fluorescent reagent from a fluorescence image of a biological sample based on the fluorescence image, a reference spectrum associated with the biological sample or the fluorescent reagent, and morphological information of a cell, wherein the biological sample includes the cell and an antigen,
the morphological information includes distribution information of a target in the biological sample,
the target is the antigen in the biological sample, and
the distribution information includes a distribution of expression levels of the antigen.

2. The information processing apparatus according to claim 1, wherein the separation unit is further configured to separate a fluorescence signal of the biological sample from the fluorescence image.

3. The information processing apparatus according to claim 1, wherein the morphological information further includes a binary mask image that indicates the distribution of the expression levels of the antigen.

4. The information processing apparatus according to claim 1, wherein the fluorescent reagent includes an antibody labeled with a fluorescent dye.

5. The information processing apparatus according to claim 1, further comprising an image generation unit configured to generate a corrected fluorescence image based the separated fluorescence signal.

6. The information processing apparatus according to claim 1, further comprising an extraction unit configured to optimize the reference spectrum of the biological sample or the fluorescent reagent.

7. The information processing apparatus according to claim 6, wherein the separation unit is further configured to separate the fluorescence signal of the fluorescence image, based on the reference spectrum and the morphological information, by a least squares method, a weighted least squares method, or a constrained least squares method.

8. The information processing apparatus according to claim 6, wherein the separation unit is further configured to:
input the fluorescence image, the reference spectrum, and the morphological information to an image generation model; and
separate the fluorescence signal of the fluorescence image based on the input of the fluorescence image, the reference spectrum, and the morphological information to the image generation model.

9. The information processing apparatus according to claim 8, further comprising a model generation unit configured to:
receive color separation information as teacher data, wherein the color separation information is a result of the separation of the fluorescence signal of the fluorescence image;
learn the color separation information; and
generate the image generation model based on the learned color separation information.

10. The information processing apparatus according to claim 6, wherein the separation unit is further configured to separate the fluorescence signal of the fluorescence image based on a bright field image and an unstained image of the biological sample.

11. The information processing apparatus according to claim 10, wherein the separation unit is further configured to:
input the fluorescence image, the bright field image, the unstained image, and staining information to a first inference model; and
separate the fluorescence signal of the fluorescence image based on the input of the fluorescence image, the bright field image, the unstained image, and the staining information to the first inference model.

12. The information processing apparatus according to claim 11, wherein
the fluorescent reagent includes an antibody labeled with a fluorescent dye, and
the staining information includes information on a combination of the antibody and the fluorescent dye in the fluorescent reagent.

13. The information processing apparatus according to claim 11, further comprising a model generation unit configured to:
receive, as teacher data, the morphological information which is a binary mask image;
learn the received morphological information; and
train the first inference model based on the learned morphological information.

14. The information processing apparatus according to claim 13, wherein the morphological information as the teacher data includes region information of the biological sample.

15. The information processing apparatus according to claim 14, wherein
the model generation unit is further configured to execute segmentation to obtain the region information of the biological sample,
the morphological information as the teacher data includes the region information of the biological sample obtained by the segmentation, and
the region information of the biological sample includes the region information on at least one of a tissue, the cell, or a nucleus.

16. The information processing apparatus according to claim 15, wherein the region information of the biological sample further includes the staining information.

17. The information processing apparatus according to claim 16, wherein
the first inference model further includes a second inference model,
the model generation unit is further configured to:
execute classification for the region information of each the tissue or the cell;
learn the staining information specified by the classification as the teacher data; and
generate the second inference model based on the learned staining information specified by the classification.

18. An information processing system, comprising:
an information processing apparatus configured to:
acquire a fluorescence image of a biological sample that includes a cell, an antigen, and a reference spectrum associated with the biological sample or a fluorescent reagent; and
control separation of a fluorescence signal of the fluorescent reagent from the fluorescence image based on the fluorescence image, the reference spectrum, and morphological information of the cell, wherein
the morphological information includes distribution information of a target in the biological sample,
the target is the antigen in the biological sample, and
the distribution information includes a distribution of expression levels of the antigen.

19. An information processing apparatus, comprising:
a separation unit configured to separate a fluorescence signal, of a fluorescent reagent from a fluorescence image of a biological sample, based on the fluorescence image, a reference spectrum associated with the biological sample or the fluorescent reagent, and morphological information of a cell, wherein
the biological sample includes the cell, and an image generation unit configured to generate a corrected fluorescence image based the separated fluorescence signal.

* * * * *